(12) United States Patent
Bradbury et al.

(10) Patent No.: US 10,671,389 B2
(45) Date of Patent: *Jun. 2, 2020

(54) VECTOR FLOATING POINT TEST DATA CLASS IMMEDIATE INSTRUCTION

(71) Applicant: INTERNATIONAL BUSINESS MACHINES CORPORATION, Armonk, NY (US)

(72) Inventors: Jonathan D. Bradbury, Poughkeepsie, NY (US); Eric M. Schwarz, Gardiner, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,965

(22) Filed: Jan. 21, 2019

(65) Prior Publication Data
US 2019/0155602 A1    May 23, 2019

Related U.S. Application Data

(63) Continuation of application No. 15/237,750, filed on Aug. 16, 2016, now Pat. No. 10,203,956, which is a (Continued)

(51) Int. Cl.
    G06F 9/30    (2018.01)
(52) U.S. Cl.
    CPC ........ *G06F 9/30036* (2013.01); *G06F 9/3001* (2013.01); *G06F 9/30018* (2013.01);
    (Continued)

(58) Field of Classification Search
    CPC .............. G06F 9/3001; G06F 9/30018; G06F 9/30036; G06F 9/30032; G06F 9/30167;
    (Continued)

(56) References Cited

U.S. PATENT DOCUMENTS

| 4,569,016 A | 2/1986 | Hao et al. |
| 4,777,593 A | 10/1988 | Yoshida |

(Continued)

FOREIGN PATENT DOCUMENTS

| CN | 102122241 A | 7/2011 |
| CN | 101901127 A | 12/2012 |

(Continued)

OTHER PUBLICATIONS

"Intel® 64 and IA-32 Architectures Developer's Manual: vol. 2B, Instructions Set Reference, A-L," Order No. 253666-041US, Dec. 2011, pp. 1-550.

(Continued)

*Primary Examiner* — Steven G Snyder
(74) *Attorney, Agent, or Firm* — Steven Chiu, Esq.; Blanche E. Schiller, Esq.; Heslin Rothenberg Farley & Mesiti P.C.

(57) ABSTRACT

A Vector Floating Point Test Data Class Immediate instruction is provided that determines whether one or more elements of a vector specified in the instruction are of one or more selected classes and signs. If a vector element is of a selected class and sign, an element in an operand of the instruction corresponding to the vector element is set to a first defined value, and if the vector element is not of the selected class and sign, the operand element corresponding to the vector element is set to a second defined value.

20 Claims, 22 Drawing Sheets

Related U.S. Application Data continuation of application No. 14/561,459, filed on Dec. 5, 2014, now Pat. No. 9,436,467, which is a continuation of application No. 13/748,477, filed on Jan. 23, 2013, now Pat. No. 9,471,308.

(52) U.S. Cl.
CPC ...... *G06F 9/30021* (2013.01); *G06F 9/30032* (2013.01); *G06F 9/30145* (2013.01); *G06F 9/30167* (2013.01); *G06F 9/30185* (2013.01)

(58) Field of Classification Search
CPC ............. G06F 9/30021; G06F 9/30145; G06F 9/30185
See application file for complete search history.

(56) References Cited

U.S. PATENT DOCUMENTS

| | | | |
|---|---|---|---|
| 4,881,168 A | 11/1989 | Inagami et al. | |
| 5,043,867 A | 8/1991 | Bhandarkar | |
| 5,053,986 A | 10/1991 | Ahsan et al. | |
| 5,113,521 A | 5/1992 | McKeen | |
| 5,247,524 A | 9/1993 | Callon | |
| 5,388,233 A | 2/1995 | Hays et al. | |
| 5,450,605 A | 9/1995 | Grochowski et al. | |
| 5,469,551 A | 11/1995 | Sites et al. | |
| 5,487,159 A | 1/1996 | Byers | |
| 5,537,606 A | 7/1996 | Byrne | |
| 5,551,013 A | 8/1996 | Beausoleil et al. | |
| 5,574,873 A | 11/1996 | Davidian | |
| 5,663,952 A | 9/1997 | Gentry, Jr. | |
| 5,673,407 A | 9/1997 | Poland | |
| 5,680,338 A | 10/1997 | Agarwal et al. | |
| 5,701,316 A | 12/1997 | Alferness et al. | |
| 5,768,168 A | 6/1998 | Im | |
| 5,790,825 A | 8/1998 | Traut | |
| 5,825,678 A * | 10/1998 | Smith ................. | G06F 7/483 708/495 |
| 5,832,235 A | 11/1998 | Wilkes | |
| 5,884,071 A | 3/1999 | Kosaraju | |
| 5,953,240 A | 9/1999 | Prabhu et al. | |
| 5,960,012 A | 9/1999 | Spracklen | |
| 5,974,522 A | 10/1999 | Torng et al. | |
| 6,009,261 A | 12/1999 | Scalzi et al. | |
| 6,038,652 A | 3/2000 | Phillips et al. | |
| 6,047,304 A | 4/2000 | Ladwig et al. | |
| 6,049,815 A | 4/2000 | Lambert et al. | |
| 6,088,782 A | 7/2000 | Lee | |
| 6,105,129 A | 8/2000 | Meier et al. | |
| 6,173,393 B1 | 1/2001 | Palanca et al. | |
| 6,223,320 B1 | 4/2001 | Dubey et al. | |
| 6,253,313 B1 | 6/2001 | Morrison et al. | |
| 6,256,782 B1 | 7/2001 | Nakamura | |
| 6,308,255 B1 | 10/2001 | Gorishek, IV et al. | |
| 6,425,039 B2 | 7/2002 | Yoshioka et al. | |
| 6,463,582 B1 | 10/2002 | Lethin et al. | |
| 6,523,054 B1 | 2/2003 | Kamijo | |
| 6,591,397 B1 | 7/2003 | Henriksen | |
| 6,609,142 B1 | 8/2003 | Liardet | |
| 6,643,821 B2 | 11/2003 | Karim | |
| 6,675,292 B2 | 1/2004 | Prabhu et al. | |
| 6,701,424 B1 | 3/2004 | Liao et al. | |
| 6,711,602 B1 | 3/2004 | Bhandal et al. | |
| 6,748,522 B1 | 6/2004 | Gregoire et al. | |
| 6,760,742 B1 | 7/2004 | Hoyle | |
| 6,760,837 B1 | 7/2004 | Laurenti et al. | |
| 6,839,828 B2 | 1/2005 | Gschwind et al. | |
| 6,848,074 B2 | 1/2005 | Coombs | |
| 7,013,321 B2 | 3/2006 | Saulsbury | |
| 7,082,452 B2 | 7/2006 | Stein et al. | |
| 7,082,742 B2 | 8/2006 | Schrattenecker | |
| 7,096,399 B2 | 8/2006 | Pieczul | |
| 7,139,900 B2 | 11/2006 | Gee et al. | |
| 7,275,148 B2 | 9/2007 | Moyer et al. | |
| 7,301,541 B2 | 11/2007 | Hansen et al. | |
| 7,313,583 B2 | 12/2007 | Porten et al. | |
| 7,363,574 B1 | 4/2008 | Maitland et al. | |
| 7,383,483 B2 | 6/2008 | Biran et al. | |
| 7,421,566 B2 | 9/2008 | Gschwind et al. | |
| 7,461,117 B2 | 12/2008 | Trong et al. | |
| 7,480,787 B1 | 1/2009 | Caprioli et al. | |
| 7,493,481 B1 | 2/2009 | Kizhepat et al. | |
| 7,512,647 B2 | 3/2009 | Wilson et al. | |
| 7,805,480 B2 | 9/2010 | Dupaquis et al. | |
| 7,809,132 B2 | 10/2010 | Nadehara | |
| 7,843,459 B2 | 11/2010 | Hansen et al. | |
| 7,847,803 B1 | 12/2010 | Van Hook | |
| 7,849,291 B2 | 12/2010 | Hansen et al. | |
| 7,870,296 B2 | 1/2011 | Fukutomi et al. | |
| 8,074,058 B2 | 12/2011 | Van Hook et al. | |
| 8,112,691 B1 | 2/2012 | Spracklen | |
| 8,417,961 B2 | 4/2013 | Olson et al. | |
| 8,539,472 B2 | 9/2013 | Fabregas et al. | |
| 8,560,591 B2 | 10/2013 | Lundvall | |
| 8,626,970 B2 | 1/2014 | Craddock et al. | |
| 8,731,947 B2 | 5/2014 | Li | |
| 8,793,470 B2 | 7/2014 | Coke et al. | |
| 8,793,472 B2 | 7/2014 | Gonion et al. | |
| 8,850,166 B2 | 9/2014 | Jacobi | |
| 8,918,623 B2 | 12/2014 | Gschwind et al. | |
| 9,256,427 B2 * | 2/2016 | Greiner ............... | G06F 9/30072 |
| 9,262,161 B2 * | 2/2016 | Greiner ............... | G06F 9/30072 |
| 9,354,877 B2 * | 5/2016 | Toll ..................... | G06F 9/30098 |
| 9,436,434 B2 | 9/2016 | Cuffney | |
| 9,436,467 B2 | 9/2016 | Bradbury | |
| 9,442,722 B2 * | 9/2016 | Bradury .............. | G06F 9/30018 |
| 9,459,864 B2 * | 10/2016 | Bradbury ............. | G06F 9/30018 |
| 9,471,308 B2 | 10/2016 | Bradbury | |
| 9,471,311 B2 | 10/2016 | Bradbury | |
| 9,513,906 B2 | 12/2016 | Bradbury | |
| 9,582,464 B2 * | 2/2017 | Ould-Ahmed-Vall ...................... G06F 15/78 |
| 9,588,762 B2 * | 3/2017 | Bradbury ............. | G06F 9/30018 |
| 9,588,763 B2 * | 3/2017 | Bradbury ............. | G06F 9/30018 |
| 9,703,557 B2 | 7/2017 | Bradbury | |
| 9,715,383 B2 * | 7/2017 | Bradbury ............. | G06F 9/30018 |
| 9,715,385 B2 | 7/2017 | Bradbury | |
| 9,727,334 B2 | 8/2017 | Bradbury | |
| 9,733,938 B2 | 8/2017 | Bradbury | |
| 9,740,482 B2 | 8/2017 | Bradbury | |
| 9,740,483 B2 | 8/2017 | Bradbury | |
| 9,772,843 B2 | 9/2017 | Bradbury | |
| 9,778,932 B2 * | 10/2017 | Bradbury ............. | G06F 15/8053 |
| 9,804,840 B2 | 10/2017 | Bradbury | |
| 9,823,924 B2 | 11/2017 | Bradbury | |
| 9,823,926 B2 | 11/2017 | Bradbury | |
| 9,880,840 B2 * | 1/2018 | Cowlishaw ............ | G06F 7/491 |
| 10,101,998 B2 | 10/2018 | Bradbury | |
| 10,146,534 B2 | 12/2018 | Bradbury | |
| 10,203,956 B2 * | 2/2019 | Bradbury ............. | G06F 9/3001 |
| 10,235,271 B2 * | 3/2019 | Gschwind ............ | G06F 11/362 |
| 10,303,471 B2 * | 5/2019 | Ould-Ahmed-Vall ...................... G06F 15/78 |
| 10,324,719 B2 * | 6/2019 | Cowlishaw ............ | G06F 7/491 |
| 10,338,918 B2 * | 7/2019 | Bradbury ............. | G06F 9/3001 |
| 10,365,990 B2 * | 7/2019 | Gschwind ............ | G06F 11/362 |
| 2002/0095642 A1 | 7/2002 | Karim et al. | |
| 2003/0037085 A1 | 2/2003 | Sandbote | |
| 2003/0110196 A1 | 6/2003 | Stein et al. | |
| 2004/0054877 A1 | 3/2004 | Macy, Jr. et al. | |
| 2004/0078410 A1 | 4/2004 | Porten et al. | |
| 2004/0078411 A1 | 4/2004 | Porten et al. | |
| 2004/0098548 A1 | 5/2004 | Hansen et al. | |
| 2006/0106910 A1 | 5/2006 | An | |
| 2006/0230409 A1 | 10/2006 | Frigo et al. | |
| 2006/0284745 A1 | 12/2006 | Cameron | |
| 2007/0038848 A1 | 2/2007 | Gschwind et al. | |
| 2007/0118720 A1 * | 5/2007 | Espasa ................ | G06F 9/30018 712/5 |
| 2007/0260826 A1 | 11/2007 | Greiner et al. | |
| 2008/0021943 A1 | 1/2008 | Chiu | |
| 2008/0046682 A1 | 2/2008 | Neumann | |
| 2008/0077643 A1 | 3/2008 | Handa | |

(56) References Cited

U.S. PATENT DOCUMENTS

| | | | |
|---|---|---|---|
| 2008/0104375 A1 | 5/2008 | Hansen | |
| 2008/0114969 A1 | 5/2008 | Gonion | |
| 2008/0189519 A1 | 8/2008 | Gschwind | |
| 2008/0240422 A1 | 10/2008 | Ozturk et al. | |
| 2008/0270508 A1* | 10/2008 | Lundvall | G06F 7/491 |
| | | | 708/510 |
| 2009/0019262 A1 | 1/2009 | Tashiro et al. | |
| 2009/0172365 A1 | 7/2009 | Orenstien et al. | |
| 2009/0199075 A1 | 8/2009 | Demjanenko et al. | |
| 2009/0300335 A1 | 12/2009 | Muff | |
| 2009/0310775 A1 | 12/2009 | Gueron et al. | |
| 2009/0313442 A1 | 12/2009 | Moyer | |
| 2010/0054461 A1 | 3/2010 | Ciet et al. | |
| 2010/0195820 A1 | 8/2010 | Frank | |
| 2010/0274990 A1 | 10/2010 | Wilder et al. | |
| 2010/0312988 A1 | 12/2010 | Bjorklund et al. | |
| 2010/0325483 A1 | 12/2010 | Gonion et al. | |
| 2011/0047358 A1 | 2/2011 | Eichenberger et al. | |
| 2011/0231633 A1 | 9/2011 | Grisenthwaite | |
| 2011/0258415 A1 | 10/2011 | Chou et al. | |
| 2011/0276764 A1 | 11/2011 | Alexander et al. | |
| 2011/0314263 A1 | 12/2011 | Greiner et al. | |
| 2012/0150933 A1 | 6/2012 | Boersma et al. | |
| 2012/0265967 A1 | 10/2012 | Gschwind et al. | |
| 2012/0303691 A1 | 11/2012 | Muff et al. | |
| 2013/0117546 A1 | 5/2013 | Jacobi et al. | |
| 2013/0246751 A1 | 9/2013 | Bradbury | |
| 2013/0246752 A1 | 9/2013 | Bradbury | |
| 2013/0246753 A1 | 9/2013 | Bradbury | |
| 2013/0246757 A1 | 9/2013 | Bradbury et al. | |
| 2013/0246758 A1 | 9/2013 | Bradbury et al. | |
| 2013/0246759 A1 | 9/2013 | Bradbury et al. | |
| 2013/0246762 A1 | 9/2013 | Bradbury et al. | |
| 2013/0246764 A1 | 9/2013 | Bradbury et al. | |
| 2013/0246767 A1 | 9/2013 | Bradbury et al. | |
| 2013/0246768 A1 | 9/2013 | Gschwind et al. | |
| 2013/0305020 A1 | 11/2013 | Valentine et al. | |
| 2013/0339661 A1 | 12/2013 | Ould-Ahmed-Vall et al. | |
| 2014/0019713 A1* | 1/2014 | Ould-Ahmed-Vall | |
| | | | G06F 15/78 |
| | | | 712/4 |
| 2014/0019732 A1 | 1/2014 | Toll | |
| 2014/0122831 A1 | 5/2014 | Uliel et al. | |
| 2014/0164740 A1 | 6/2014 | Gschwind et al. | |
| 2014/0164744 A1 | 6/2014 | Greiner | |
| 2014/0164746 A1 | 6/2014 | Greiner et al. | |
| 2014/0164747 A1 | 6/2014 | Gschwind et al. | |
| 2014/0173255 A1 | 6/2014 | Thantry et al. | |
| 2014/0189307 A1 | 7/2014 | Valentine et al. | |
| 2014/0189308 A1 | 7/2014 | Hughes et al. | |
| 2014/0189309 A1 | 7/2014 | Hughes et al. | |
| 2014/0195778 A1 | 7/2014 | Ould-Ahmed-Vall et al. | |
| 2014/0201499 A1 | 7/2014 | Ould-Ahmed-Vall et al. | |
| 2014/0208066 A1 | 7/2014 | Bradbury et al. | |
| 2014/0208067 A1 | 7/2014 | Bradbury et al. | |
| 2014/0208077 A1 | 7/2014 | Bradbury et al. | |
| 2014/0208078 A1 | 7/2014 | Bradbury et al. | |
| 2014/0208079 A1 | 7/2014 | Bradbury et al. | |
| 2014/0208086 A1 | 7/2014 | Bradbury et al. | |
| 2014/0223138 A1 | 8/2014 | Ould-Ahmed-Vall et al. | |
| 2014/0258683 A1 | 9/2014 | Ould-Ahmed-Vall et al. | |
| 2014/0281389 A1 | 9/2014 | Loktyukhin et al. | |
| 2014/0289494 A1 | 9/2014 | Ould-Ahmed-Vall et al. | |
| 2014/0297991 A1 | 10/2014 | Corbal et al. | |
| 2014/0372727 A1 | 12/2014 | Valentine et al. | |
| 2015/0046671 A1 | 2/2015 | Ould-Ahmed-Vall et al. | |
| 2015/0046672 A1 | 2/2015 | Sych et al. | |
| 2015/0074383 A1 | 3/2015 | Bradbury et al. | |
| 2015/0095623 A1 | 4/2015 | Ermolaev et al. | |
| 2015/0095624 A1 | 4/2015 | Bradbury et al. | |
| 2015/0143074 A1 | 5/2015 | Bradbury et al. | |
| 2015/0143075 A1 | 5/2015 | Bradbury et al. | |
| 2015/0143080 A1 | 5/2015 | Bradbury et al. | |
| 2015/0143088 A1 | 5/2015 | Bradbury et al. | |
| 2016/0026466 A1 | 1/2016 | Thantry et al. | |
| 2016/0357557 A1 | 12/2016 | Bradbury et al. | |
| 2017/0024204 A1 | 1/2017 | Bradbury | |
| 2017/0031683 A1 | 2/2017 | Bradbury et al. | |
| 2017/0039067 A1 | 2/2017 | Bradbury et al. | |
| 2017/0090931 A1 | 3/2017 | Frazier et al. | |
| 2017/0090932 A1 | 3/2017 | Frazier et al. | |
| 2017/0242694 A1* | 8/2017 | Ould-Ahmed-Vall | |
| | | | G06F 15/78 |
| 2017/0242697 A1 | 8/2017 | Baghsorkhi | |
| 2017/0269932 A1 | 9/2017 | Bradbury | |
| 2017/0286112 A1 | 10/2017 | Espasa | |
| 2019/0034202 A1 | 1/2019 | Bradbury | |
| 2019/0065183 A1 | 2/2019 | Bradbury | |
| 2019/0155602 A1 | 5/2019 | Bradbury | |
| 2019/0188112 A1* | 6/2019 | Gschwind | G06F 11/362 |

FOREIGN PATENT DOCUMENTS

| | | | |
|---|---|---|---|
| CN | 102819710 A | 12/2012 | |
| EP | 0141232 A2 | 5/1985 | |
| EP | 0335514 A2 | 3/1989 | |
| EP | 1102163 A2 | 5/2001 | |
| EP | 2309382 A1 | 4/2011 | |
| EP | 1879103 B1 | 3/2012 | |
| JP | S62267869 A | 11/1987 | |
| JP | H01120638 A | 5/1989 | |
| JP | H0322032 A | 1/1991 | |
| JP | 2000207387 A | 7/2000 | |
| JP | 2000259579 A | 9/2000 | |
| JP | 2000294960 A | 10/2000 | |
| JP | 2004151981 A | 5/2004 | |
| RU | 2409840 C2 | 1/2011 | |
| WO | WO2006121444 A1 | 11/2006 | |
| WO | WO2007109466 A1 | 9/2007 | |
| WO | WO2012134532 A1 | 10/2012 | |
| WO | WO-2013095599 A1 * | 6/2013 | G06F 9/30036 |

OTHER PUBLICATIONS

"Intel® 64 and IA-32 Architectures Developer's Manual: vol. 2B, Instructions Set Reference, M-Z," Order No. 253667-041US, Dec. 2011, pp. 1-1341.

"Power ISA™ Version 2.06 Revision B," International Business Machines Corporation, Jul. 23, 2010, pp. 1-524.

"Z/Architecture Principles of Operation," IBM® Publication No. SA22-7832-08, Ninth Edition, Aug. 2010, pp. 1-1568.

"Z/Architecture Principles of Operation," IBM® Publication No. SA22-7832-09, Tenth Edition, p. 1-1568, Sep. 2012.

Agerwala et al., "Architecture for Vector Mask Registers," IBM Technical Disclosure, IPCOM000044459D, TDB 12-84, p. 4061-4063, Feb. 5, 2005.

Huffman, A.E., "RMU Mask Generation From Shift Amount or Pad/Start/End Specifications," IBM Technical Disclosure, IPCOM000036715D, TDB 10-89, p. 197-204, Jan. 29, 2005.

Mi Lu, "Arithmetic and Logic in Computer Systems," Mar. 4, 2005, John Wiley & Sons, p. 46 (plus cover sheets).

Mi Lu, "Arithmetic and Logic in Computer Systems," Mar. 4, 2005, John Wiley & Sons, pp. 1-246.

Shedletsky, John J., "Comment on the Sequential and Indeterminate Behavior of an End-Around_Carry Adder," Mar. 17, 2009, pp. 271-272.

Braden, R.T. et al., "Computing the Internet Checksum (RFC1071)," IP.com No. IPCOM000001880D, Sep. 1, 1988, pp. 1-24 (+ cover).

* cited by examiner

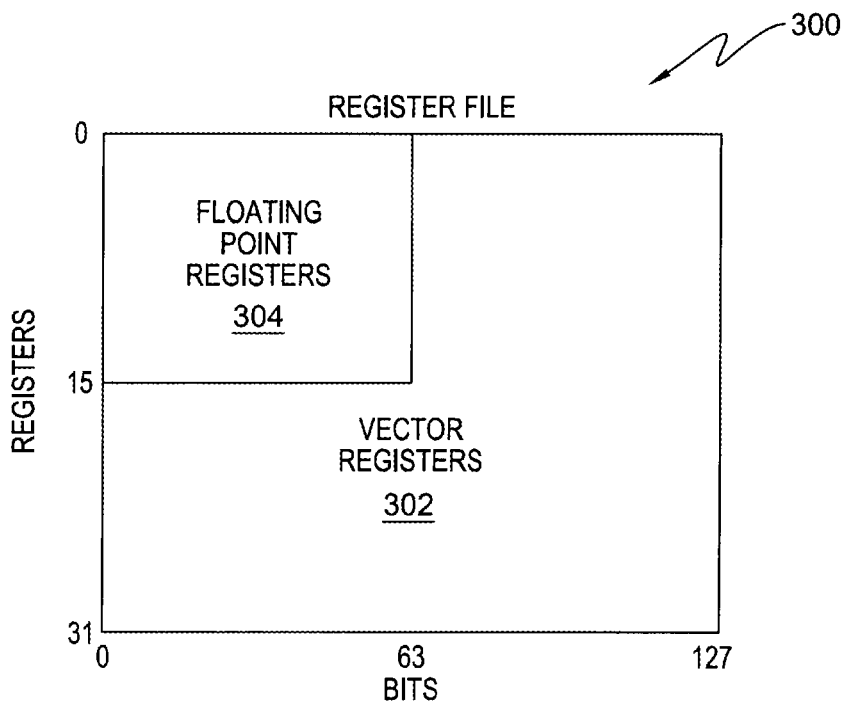
FIG. 3
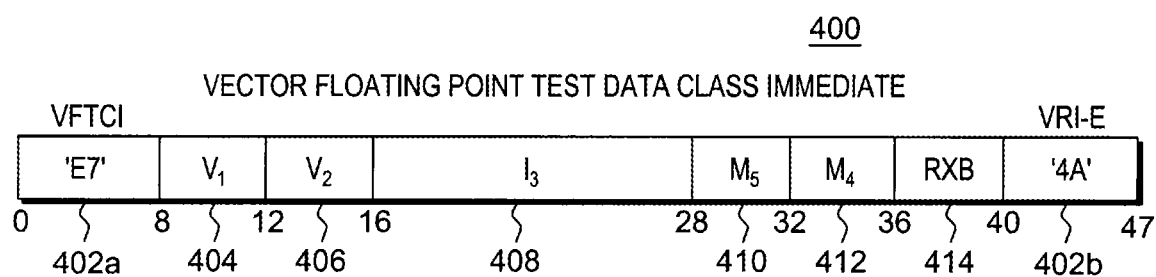
FIG. 4A
| 430 — BFP ELEMENT CLASS | BIT USED WHEN SIGN IS — 432 | |
|---|---|---|
| | + | - |
| ZERO | 0 | 1 |
| NORMAL NUMBER | 2 | 3 |
| SUBNORMAL NUMBER | 4 | 5 |
| INFINITY | 6 | 7 |
| QUIET NAN | 8 | 9 |
| SIGNALING NAN | 10 | 11 |
FIG. 4B

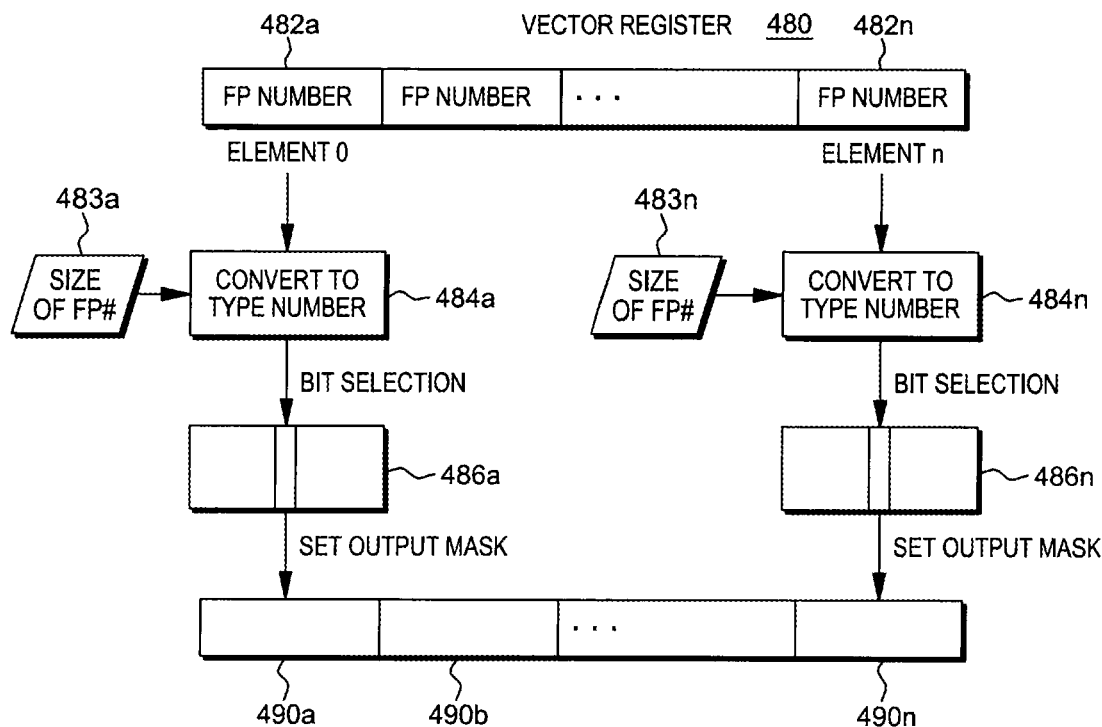

FIG. 4D

| ENTITY | SIGN | BIASED EXPONENT | UNIT BIT * | FRACTION |
|---|---|---|---|---|
| TRUE ZERO | ± | 0 | 0 | 0 |
| DENORMALIZED NUMBERS | ± | 0** | 0 | NOT 0 |
| NORMALIZED NUMBERS | ± | NOT 0, NOT ALL ONES | 1 | ANY |
| INFINITY | ± | ALL ONES | - | 0 |
| QUIET NAN | ± | ALL ONES | - | FO=1, Fr=ANY |
| SIGNALING NAN | ± | ALL ONES | - | FO=0, Fr≠0 |

EXPLANATION:
* THE UNIT BIT IS IMPLIED
** THE BIASED EXPONENT IS TREATED ARITHMETICALLY AS IF IT HAD THE VALUE ONE
NAN  NOT A NUMBER
FO   LEFTMOST BIT OF FRACTION
Fr   REMAINING BITS OF FRACTION

FIG. 4E

900
VECTOR EXCEPTION CODE

VECTOR FLOATING POINT TEST DATA CLASS IMMEDIATE INSTRUCTION

This application is a continuation of co-pending U.S. patent application Ser. No. 15/237,750, filed Aug. 16, 2016, entitled "VECTOR FLOATING POINT TEST DATA CLASS IMMEDIATE INSTRUCTION", which is a continuation of U.S. Pat. No. 9,436,467 B2, issued Sep. 6, 2016, entitled "VECTOR FLOATING POINT TEST DATA CLASS IMMEDIATE INSTRUCTION," which is a continuation of U.S. Pat. No. 9,471,308, issued Oct. 18, 2016, entitled "VECTOR FLOATING POINT TEST DATA CLASS IMMEDIATE INSTRUCTION," each of which is hereby incorporated herein by reference in its entirety.

BACKGROUND

One or more aspects relate, in general, to processing within a computing environment, and in particular, to vector processing within such an environment.

Processing within a computing environment includes controlling operation of one or more central processing units (CPUs). Normally, operation of a central processing unit is controlled by instructions in storage. Instructions may have different formats and often specify registers to be used in performing various operations.

Depending on the architecture of the central processing unit, various types of registers may be used including, for instance, general purpose registers, special purpose registers, floating point registers and/or vector registers, as examples. Different types of registers may be used with different types of instructions. As examples, floating point registers store floating point numbers to be used by floating point instructions; and vector registers hold data for vector processing performed by Single Instruction, Multiple Data (SIMD) instructions, including vector instructions.

SUMMARY

Shortcomings of the prior art are overcome and advantages are provided through the provision of a computer program product for executing a machine instruction. The computer program product includes a computer readable storage medium readable by a processing circuit and storing instructions for execution by the processing circuit for performing a method. The method includes obtaining a machine instruction for execution. The machine instruction has associated therewith an opcode to identify a Vector Floating Point Test Data Class Immediate operation, a first operand and a second operand. The machine instruction is executed. The executing includes determining properties of a chosen element of the second operand, selecting from an input to the machine instruction a selected data unit representing the properties of the chosen element, the input including one or more data units to represent one or more properties, and checking whether the selected data unit is set to a particular value. Based on the checking, setting an element in the first operand that corresponds to the chosen element of the second operand, the setting based on whether the selected data unit is set to the particular value.

Computer-implemented methods and systems relating to one or more aspects are also described and may be claimed herein. Further, services relating to one or more aspects are also described and may be claimed herein.

Additional features and advantages are realized through the techniques of one or more aspects. Other embodiments and aspects are described in detail herein and are considered a part of the claims.

BRIEF DESCRIPTION OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

FIG. 3 depicts one example of a register file;

FIG. 4A depicts one example of a format of a Vector Floating Point Test Data Class Immediate instruction;

FIG. 4B depicts one example of bit values of the third operand of the Vector Floating Point Test Data Class Immediate instruction of FIG. 4A;

FIG. 4D depicts one example of a block diagram of execution of the Vector Floating Point Test Data Class Immediate instruction of FIG. 4A;

FIG. 4E depicts one example of a definition of various classes of binary floating point data;

DETAILED DESCRIPTION

In accordance with one or more aspects, a vector facility is provided that includes various vector instructions, as well as vector exception processing. Each of the instructions described herein is a Single Instruction, Multiple Data (SIMD) instruction that uses one or more vector registers (also referred to herein as vectors). A vector register is, for instance, a processor register (also referred to as a hardware register), which is a small amount of storage (e.g., not main memory) available as part of a central processing unit (CPU) or other processor. Each vector register contains a vector operand having one or more elements, and an element is, for example, one, two, four or eight bytes in length. In other embodiments, elements can be of other sizes; and a vector instruction need not be a SIMD instruction.

Figure 1:
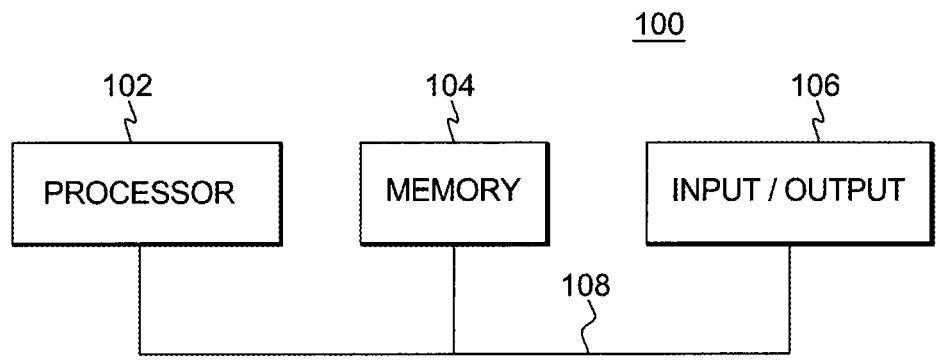
FIG. 1 depicts one example of a computing environment to incorporate and use one or more aspects.

One embodiment of a computing environment to incorporate and use one or more aspects is described with reference to FIG. 1. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is based on the z/Architecture offered by International Business Machines Corporation, and is part of a server, such as the System z server, which is also offered by International Business Machines Corporation and implements the z/Architecture. One embodiment of the z/Architecture is described in an IBM® publication entitled, "z/Architecture Principles of Operation," IBM® Publication No. SA22-7832-09, Tenth Edition, September, 2012, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation, Armonk, N.Y., USA. Other names used herein may be registered trademarks, trademarks, or product names of International Business Machines Corporation or other companies.

In a further embodiment, processor 102 is based on the Power Architecture offered by International Business Machines Corporation. One embodiment of the Power Architecture is described in "Power ISA™ Version 2.06 Revision B," International Business Machines Corporation, Jul. 23, 2010, which is hereby incorporated herein by reference in its entirety. POWER ARCHITECTURE® is a registered trademark of International Business Machines Corporation.

In yet a further embodiment, processor 102 is based on an Intel architecture offered by Intel Corporation. One embodiment of the Intel architecture is described in "Intel® 64 and IA-32 Architectures Developer's Manual: Vol. 2B, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013, each of which is hereby incorporated herein by reference in its entirety. Intel® is a registered trademark of Intel Corporation, Santa Clara, Calif.

Figure 2A:
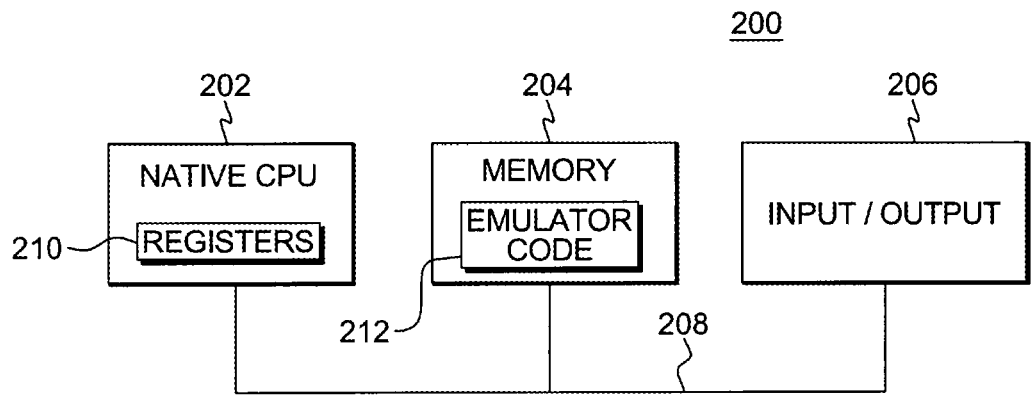
FIG. 2A depicts another example of a computing environment to incorporate and use one or more aspects.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a pSeries server or an xSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the z/Architecture, such as PowerPC processors, pSeries servers, xSeries servers, HP Superdome servers or others, to emulate the z/Architecture and to execute software and instructions developed based on the z/Architecture.

Figure 2B:
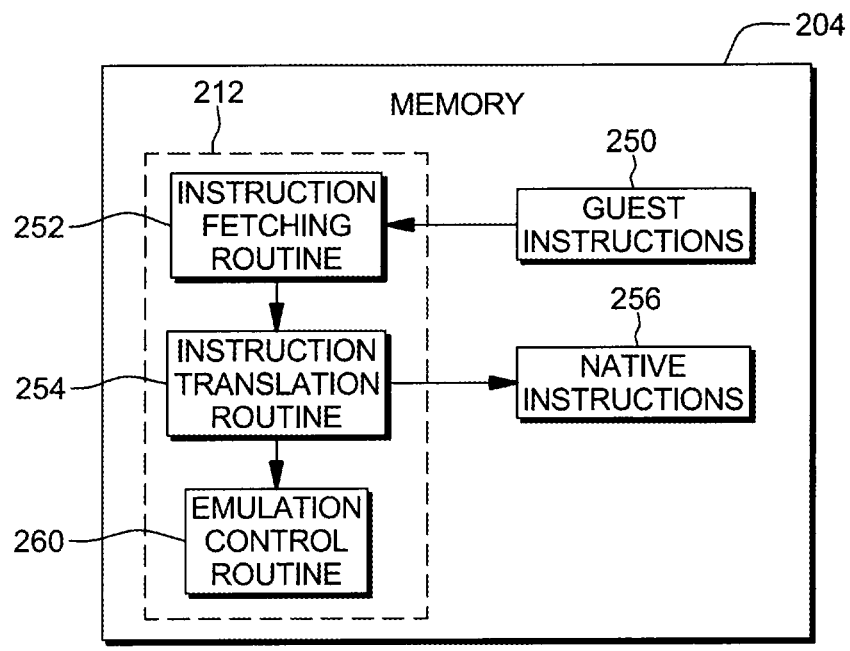
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is an instruction described herein. The instruction, which is of one architecture (e.g., the z/Architecture) is fetched from memory, translated and represented as a sequence of native instructions 256 of another architecture (e.g., PowerPC, pSeries, xSeries, Intel, etc.). These native instructions are then executed.

In one embodiment, the instructions described herein are vector instructions, which are part of a vector facility. The vector facility provides, for instance, fixed sized vectors ranging from one to sixteen elements. Each vector includes data which is operated on by vector instructions defined in the facility. In one embodiment, if a vector is made up of multiple elements, then each element is processed in parallel with the other elements. Instruction completion does not occur until processing of all the elements is complete. In other embodiments, the elements are processed partially in parallel and/or sequentially.

Vector instructions can be implemented as part of various architectures, including, but not limited to, the z/Architecture, Power, x86, IA-32, IA-64, etc. Although embodiments described herein are for the z/Architecture, the vector instructions described herein and one or more other aspects may be based on many other architectures. The z/Architecture is only one example.

In one embodiment in which the vector facility is implemented as part of the z/Architecture, to use the vector registers and instructions, a vector enablement control and a register control in a specified control register (e.g., control register 0) are set to, for instance, one. If the vector facility is installed and a vector instruction is executed without the enablement controls set, a data exception is recognized. If the vector facility is not installed and a vector instruction is executed, an operation exception is recognized.

In one embodiment, there are 32 vector registers and other types of registers can map to a quadrant of the vector registers. For instance, as shown in FIG. 3, a register file 300 includes 32 vector registers 302 and each register is 128 bits in length. Sixteen floating point registers 304, which are 64 bits in length, can overlay the vector registers. Thus, as an example, when floating point register 2 is modified, then vector register 2 is also modified. Other mappings for other types of registers are also possible.

Vector data appears in storage, for instance, in the same left-to-right sequence as other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

Each of the vector instructions described herein has a plurality of fields, and one or more of the fields has a subscript number associated therewith. The subscript number associated with a field of the instruction denotes the operand to which the field applies. For instance, the subscript number 1 associated with vector register $V_1$ denotes that the register in $V_1$ includes the first operand, and so forth. A register operand is one register in length, which is, for instance, 128 bits.

Further, many of the vector instructions provided with the vector facility have a field of specified bits. This field, referred to as the register extension bit or RXB, includes the most significant bit for each of the vector register designated operands. Bits for register designations not specified by the instruction are to be reserved and set to zero. The most significant bit is concatenated, for instance, to the left of the four-bit register designation to create a five-bit vector register designation.

In one example, the RXB field includes four bits (e.g., bits 0-3), and the bits are defined, as follows:
  0—Most significant bit for the first vector register designation (e.g., in bits 8-11) of the instruction.
  1—Most significant bit for the second vector register designation (e.g., in bits 12-15) of the instruction, if any.
  2—Most significant bit for the third vector register designation (e.g., in bits 16-19) of the instruction, if any.
  3—Most significant bit for the fourth vector register designation (e.g., in bits 32-35) of the instruction, if any.

Each bit is set to zero or one by, for instance, the assembler depending on the register number. For instance, for registers 0-15, the bit is set to 0; for registers 16-31, the bit is set to 1, etc.

In one embodiment, each RXB bit is an extension bit for a particular location in an instruction that includes one or more vector registers. For instance, in one or more vector instructions, bit 0 of RXB is an extension bit for location 8-11, which is assigned to, e.g., $V_1$; bit 1 of RXB is an extension bit for location 12-15, which is assigned to, e.g., $V_2$; and so forth. In a further embodiment, the RXB field includes additional bits, and more than one bit is used as an extension for each vector or location.

One instruction provided in accordance with one aspect that includes the RXB field is a Vector Floating Point Test Data Class Immediate (VFTCI) instruction, an example of which is depicted in FIG. 4A. In one example, the Vector Floating Point Test Data Class Immediate instruction 400 includes opcode fields 402a (e.g., bits 0-7), 402b (e.g., bits 40-47) indicating a Vector Floating Point Test Data Class Immediate operation; a first vector register field 404 (e.g., bits 8-11) used to designate a first vector register ($V_1$); a second vector register field 406 (e.g., bits 12-15) used to designate a second vector register ($V_2$); an immediate field ($I_3$) 408 (e.g., bits 16-27) to include a bitmask; a first mask field ($M_5$) 410 (e.g., bits 28-31); a second mask field ($M_4$) 412 (e.g., bits 32-35); and an RXB field 414 (e.g., bits 36-39). Each of the fields 404-414, in one example, is separate and independent from the opcode field(s). Further, in one embodiment, they are separate and independent from one another; however, in other embodiments, more than one field may be combined. Further information on the use of these fields is described below.

In one example, selected bits (e.g., the first two bits) of the opcode designated by opcode field 402a specify the length of the instruction. In this particular example, the selected bits indicate that the length is three halfwords. Further, the format of the instruction is a vector register-and-immediate operation with an extended opcode field. Each of the vector (V) fields, along with its corresponding extension bit specified by RXB, designates a vector register. In particular, for vector registers, the register containing the operand is specified using, for instance, a four-bit field of the register field with the addition of its corresponding register extension bit (RXB) as the most significant bit. For instance, if the four bit field is 0110 and the extension bit is 0, then the five bit field 00110 indicates register number 6.

Further, in one embodiment of the VFTCI instruction, $V_1$ 404 and $V_2$ 406 specify vector registers that include a first operand and a second operand, respectively, for the instruction. Additionally, $I_3$ 408 includes a bit mask having a plurality of bits, and each bit is used to represent a binary floating point element class and a sign (positive or negative), as described in further detail below.

In a further embodiment, the bit mask may be provided in a general purpose register, in memory, in an element of a vector register (differing per element) or from an address computation, as examples. It may be included as an explicit operand of the instruction or as an implied operand or input.

$M_5$ field 410 has, for instance, four bits, 0-3, and specifies a single element control (S) in, for instance, bit 0. If bit 0 is set to one, the operation takes place only on the zero-indexed element in the vector. The bit positions of all other elements in the first operand vector are unpredictable. If bit 0 is set to zero, the operation occurs on all elements in the vector.

$M_4$ field 412 is used, for instance, to specify the size of the floating point numbers in the second operand of the instruction. In one example, this field is set to 3, indicating a double precision binary floating point number. Other examples are also possible.

In execution of one embodiment of the Vector Floating Point Test Data Class Immediate instruction, the class and sign of the floating point element or elements of the second operand are examined to select one or more bits from the third operand. If a selected bit is set, all bit positions of the corresponding element in the first operand are set to ones; otherwise, they are set to zero. That is, if the class/sign of the floating point number contained in an element of the second operand matches a set bit (i.e., a bit set to, e.g., one) in the third operand, then an element of the first operand corresponding to the element of the second operand is set to ones. In one example, all operand elements contain long format BFP (binary floating point) numbers.

As indicated herein, the 12 bits of the third operand, bits 16-27 of the instruction text, are used to specify 12 combinations of BFP data class and sign. In one example, as shown in FIG. 4B, BFP operand elements are divided into six classes 430: zero, normal number, subnormal number, infinity, quiet NaN (Not-a-Number), and signaling NaN, and each class has a sign 432 (either positive or negative) associated therewith. Thus, for instance, bit 0 of $I_3$ specifies a zero class with a positive sign, and bit 1 specifies a zero class with a negative sign, etc.

One or more of the third operand bits may be set to one. Further, in one embodiment, the instruction may operate on one or more elements at the same time.

Operand elements, including SNaNs (Signaling NaNs) and QNaNs (Quiet NaNs), are examined without causing an IEEE exception.

Resulting Summary Condition Code for all the elements:

| | |
|---|---|
| 0 | Selected bit is 1 for all elements (match) |
| 1 | Selected bit is 1 for at least one, but not all elements (when S-bit is zero) |
| 2 | — |
| 3 | Selected bit is 0 for all elements (no match) |

IEEE Exceptions: None
Program Exceptions:
Data with a data exception code (DXC) FE, Vector Instruction, indicating a vector facility is not enabled
Operation (if the vector facility for z/Architecture is not installed)
Specification
Transaction constraint
Programming Notes:
1. This instruction provides a way to test operand elements without a risk of an exception or setting the IEEE flags.
2. When the S bit is set, a Condition Code of 1 is not used.

Further details relating to one embodiment of the Vector Floating Point Test Data Class Immediate instruction are described with reference to FIGS. 4C and 4D. In particular, FIG. 4C depicts one embodiment of the logic associated with the Vector Floating Point Test Data Class Immediate instruction performed by a processor (e.g., a CPU), and FIG. 4D depicts one example of a block diagram illustrating execution of the Vector Floating Point Test Data Class Immediate instruction.

Figure 4C:
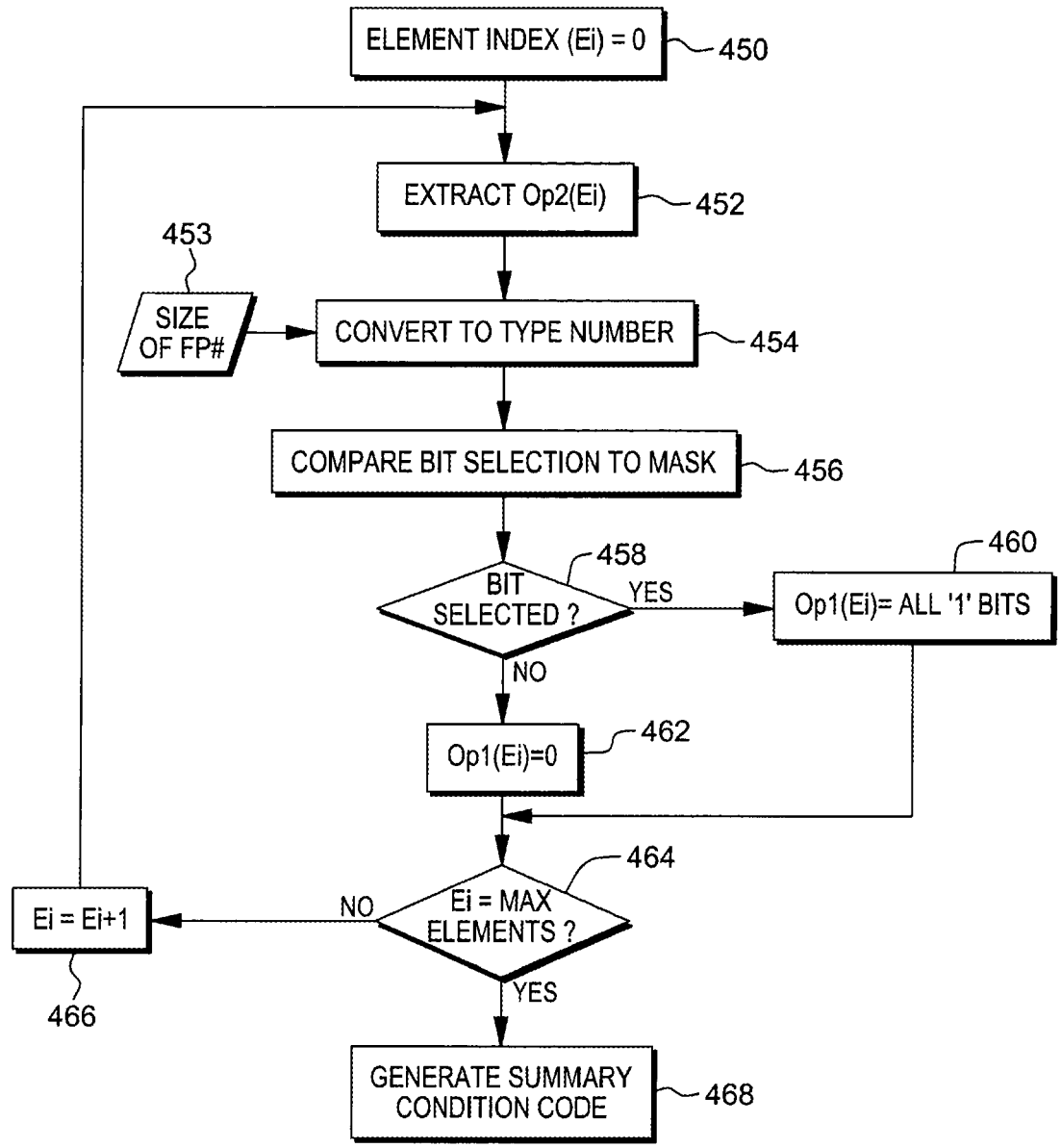
FIG. 4C depicts one embodiment of the logic associated with the Vector Floating Point Test Data Class Immediate instruction of FIG. 4A.

Referring to FIG. 4C, initially, a variable referred to as element index (Ei) is initialized to zero, STEP 450. Then, the value in element Ei, which in this case is element 0, is extracted from the second operand of the instruction (e.g., from the operand stored in the register designated by $V_2$), STEP 452. This value, which is a long format binary floating point value, is converted to a type number to obtain a class and sign for the floating point element of the second operand, as described below, STEP 454. In one example, the size of the floating point number 453 is input to the convert logic. The obtained class and sign are associated with a particular class/sign bit, as described with reference to FIG. 4B. For instance, if the conversion indicates the floating point number is a positive, normal number, then bit 2 is associated with the floating point number.

Subsequent to conversion, the bit in the third operand (referred to as the selected bit) that corresponds to the particular bit that was determined based on conversion is checked, STEP 456. If the selected bit is set, INQUIRY 458, then the element in the first operand corresponding to element (Ei) is set equal to all ones, STEP 460; otherwise, that element in the first operand is set equal to zero, STEP 462. For instance, if conversion of the floating point number in element 0 indicates a positive, normal number, then bit 2 is associated with the number. Thus, bit 2 of the third operand is checked, and if it is set to one, element 0 of the first operand is set to all ones.

Thereafter, a determination is made as to whether Ei is equal to the maximum number of elements of the second operand, INQUIRY 464. If not, then Ei is incremented by, e.g., one, STEP 466, and processing continues with STEP 452. Otherwise, if Ei is equal to the maximum number of elements, then a summary condition code is generated, STEP 468. The summary condition code summarizes the processing for all the elements of the second operand. For instance, if the selected bit is one for all the elements (match), then the resulting condition code is zero. On the other hand, if the selected bit is 1, for at least one, but not all of the elements (when S-bit is not zero), then the condition code is 1, and if the selected bit is zero for all of the elements (no match), then the condition code is 3.

The above processing is pictorially shown in the block diagram of FIG. 4D. As depicted, a vector register 480 includes a plurality of elements 482*a*-482*n*, each including a floating point number. Each floating point number and the size of the floating point number 483*a*-483*n* are input to convert-to-type number logic 484*a*-484*n*, and the output is a particular bit representing a class/sign for the floating point number. Then, a selected bit in each mask 486*a*-486*b* corresponding to each particular bit is checked. Depending on whether the selected bit is set, the first operand in a vector register 488 is set. For instance, if for element 0 of the second operand, the selected bit is set, then element 490*a* of the first operand is set to all ones. Similarly, if the selected bit for element 1 of the second operand is not set (e.g., set to zero), then element 490*b* of the first operand is set to zero, etc.

Further details of one embodiment of the convert-to-type number logic are now described. Initially, the floating point number, which is a standard IEEE binary floating point number, is converted into three parts: a sign, an exponent (8 bits)+127, and a fraction (23 bits), as is known. Then, the values of all three parts are checked to determine the class and sign, as shown in FIG. 4E. For instance, the sign is the value of the sign part, and the class (a.k.a., entity in FIG. 4E) is based on the values of the exponent and fraction (the unit bit in FIG. 4E is an implied bit of the fraction). As an example, if the values of the exponent and fraction (including the unit bit) are zeros, then, the class is zero and if the sign part is positive, then the sign is positive. Thus, bit 0 (FIG. 4B) represents the class/sign of this floating point number.

Described above is one embodiment of an instruction to test the floating point class of elements in a vector and setting a resulting bitmask. The Vector Floating Point Test Data Class Immediate instruction has an immediate field where each bit represents a class of floating point numbers to detect. Each floating point element of an input vector is tested to see if the value is in any of the classes specified by the instruction. If the floating point element is in one of the classes, the bit positions of the corresponding element of the output vector are set to 1. This provides a technique to determine some properties (e.g., class and sign) about a binary floating point number without causing any exceptions or interruptions.

In a further embodiment, the testing can be performed by checking which bits of the third operand are set (e.g., to one), and then determining whether the class/sign of one or more elements of the second operand are the same as one of the set bits. The first operand is then set based on the comparison.

Figure 5A:
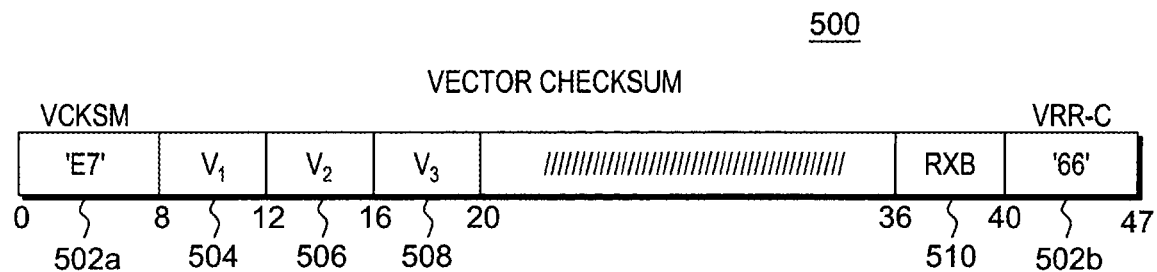
FIG. 5A depicts one example of a format of a Vector Checksum instruction.

In a further aspect, a Vector Checksum instruction is provided, an example of which is depicted in FIG. 5A. In one example, the Vector Checksum instruction 500 includes opcode fields 502*a* (e.g., bits 0-7), 502*b* (e.g., bits 40-47) indicating a vector checksum operation; a first vector register field 504 (e.g., bits 8-11) used to designate a first vector register ($V_1$); a second vector register field 506 (e.g., bits 12-15) used to designate a second vector register ($V_2$); a third vector register field 508 (e.g., bits 16-19) used to designate a third vector register ($V_3$); and an RXB field 510 (e.g., bits 36-39). Each of the fields 504 to 510, in one example, is separate and independent from the opcode field(s). Further, in one embodiment, they are separate and independent from one another; however, in other embodiments, more than one field may be combined.

In a further embodiment, the third vector register field is not included as an explicit operand of the instruction, but instead, it is an implied operand or input. Further, the value provided in the operand may be provided in other ways, such as in a general purpose register, in memory, as an address computation, etc.

In yet a further embodiment, the third operand, explicit or implied, is not provided at all.

In one example, selected bits (e.g., the first two bits) of the opcode designated by opcode field 502*a* specify the length of the instruction. In this particular example, the selected bits indicate that the length is three halfwords. Further, the format of the instruction is a vector register-and-register operation with an extended opcode field. Each of the vector (V) fields, along with this corresponding extension bit specified by RXB, designates a vector register. In particular, for vector registers, the register containing the operand is specified using, for instance, a four bit field of the register field with the addition of its corresponding register extension bit (RXB) as the most significant bit.

In execution of one embodiment of the Vector Checksum instruction, the elements from the second operand, which are, for instance, word-sized, are added together one-by-one along with a selected element of the third operand, e.g., the element in word one of the third operand. (In another embodiment, the adding of the selected element of the third operand is optional.) The sum is placed in a selected location, e.g., word one, of the first operand. Zeros are placed in the other word elements, e.g., word elements 0, and 2-3, of the first operand. The word-sized elements are all treated as 32-bit unsigned binary integers. After each addition of an element, a carry out of, e.g., bit position 0 of the sum is added to, e.g., bit position 31 of the result in word element one of the first operand.

Condition Code: The code remains unchanged.
Program Exceptions:
Data with a data exception code (DXC) FE, Vector Instruction, indicating the vector facility is not enabled
Operation (if the vector facility for z/Architecture is not installed)
Transaction constraint
Programming Notes:
1. The contents of the third operand are to contain zero at the start of a checksum computation algorithm.
2. A 16-bit checksum is used in, for example, a TCP/IP application. The following program can be executed after a 32-bit checksum has been computed:

| | |
|---|---|
| VERLLF V2, V1, 16(0) | (VERLLF—Vector Element Rotate Left Logical—4-byte value) |
| VAF V2, V1, V2 | (VAF—Vector Add—4 byte value) |

The halfword in element 2 contains the 16-bit checksum.
Further details regarding the Vector Checksum instruction are described with reference to FIGS. 5B and 5C. In one example, FIG. 5B depicts one embodiment of the logic performed by a processor in execution of the Vector Checksum instruction, and FIG. 5C depicts a block diagram of one example of execution of the Vector Checksum instruction.

Figure 5B:
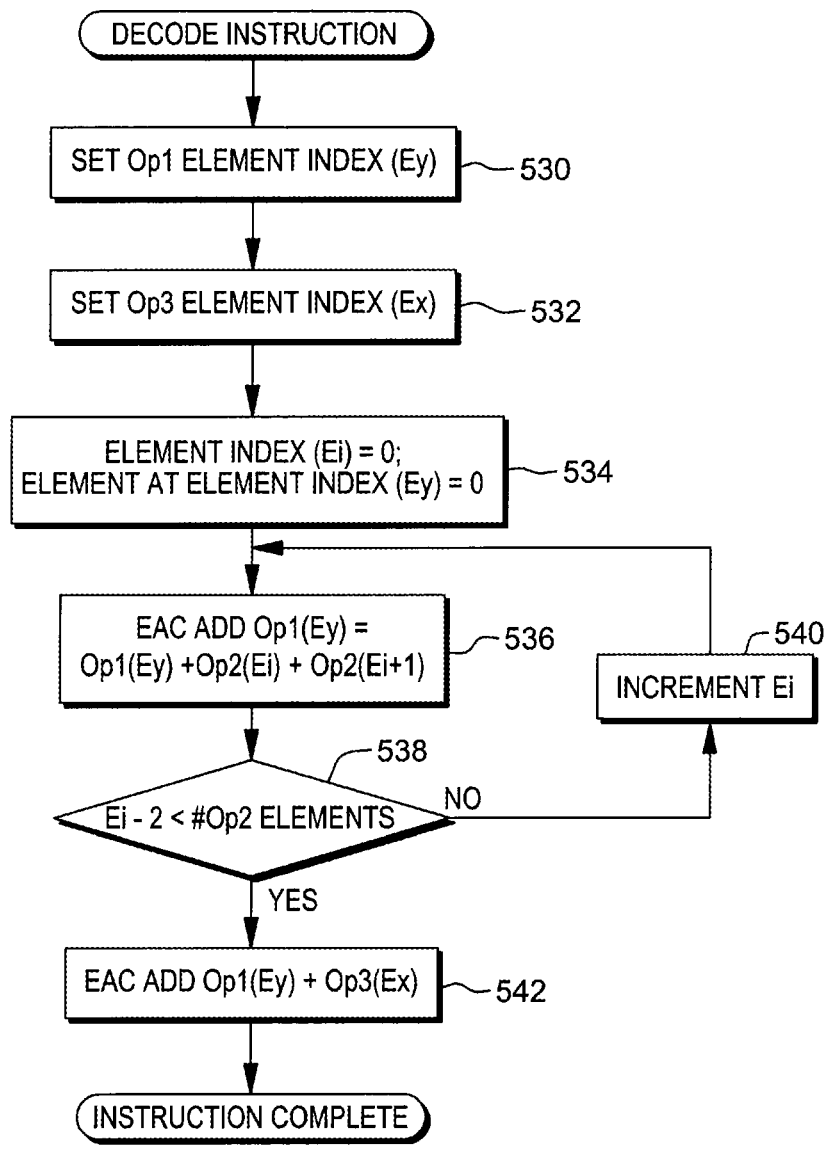
FIG. 5B depicts one embodiment of the logic associated with the Vector Checksum instruction of FIG. 5A.
Figure 5C:
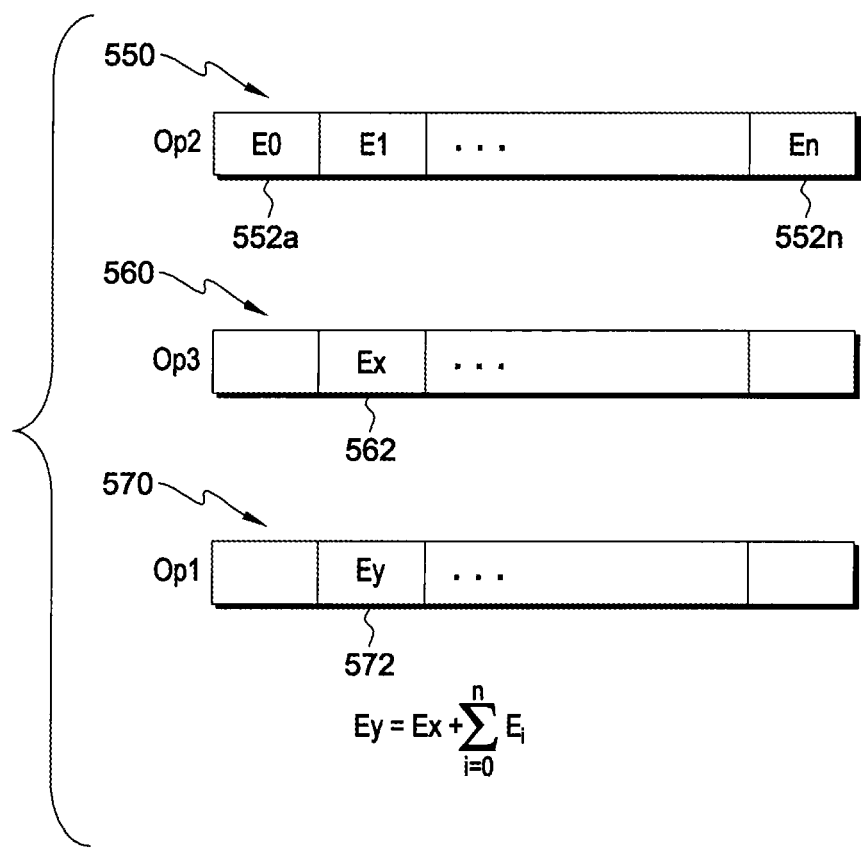
FIG. 5C depicts one example of a block diagram of execution of the Vector Checksum instruction of FIG. 5A.

Referring to FIG. 5B, initially, the element index (Ey) for the first operand (OP1) is set, e.g., to one, indicating element 1 of the first operand, STEP 530. Similarly, the element index (Ex) for the third operand (OP3) is set, e.g., to one, indicating element 1 of the third operand, STEP 532. Then, element index (Ei) is set equal to 0, and the element at element index (Ey), i.e., element 1 in this example, is initialized to zero, STEP 534. In a further embodiment, Ex and Ey may be set to any valid element index.

An end around carry (EAC) add is performed in which OP1(Ey)=OP1(Ey)+OP2(Ei)+OP2(Ei+1), STEP 536. Thus, element 1 of the output vector (OP1) is set equal to the contents of that element plus the value in element 0 of the second operand (OP2) and the value in element 1 of the second operand. With an end around carry add, an addition operation is performed and any carry out from the addition is added back in to the sum to produce a new sum.

In a further embodiment, instead of adding as described above, the following is performed: a temporary accumulator value is defined and initialized to zero, and then one element is added at a time. As a further embodiment, all words are added in parallel and there is no temporary accumulator. Other variations are also possible.

Thereafter, a determination is made as to whether there are additional elements to be added in the second operand, INQUIRY 538. For instance, is Ei−2<# of elements of the second operand. If there are more second operand elements to be added, then Ei is incremented, e.g., by two, STEP 540, and processing continues with STEP 536.

Subsequent to adding the elements across the second operand, the result is added to a value in the third operand. For instance, an end around carry add of element (Ey) of the first operand (which is the sum of the EAC add across all second operand elements) and a value in element (Ex) of the third operand (OP3) is performed (i.e., EAC ADD OP1 (Ey)+OP3(Ex)), STEP 542. This is pictorially shown in FIG. 5C.

As shown in FIG. 5C, the second operand 550 includes a plurality of elements 552a-552n, and those elements are added together one-by-one along with the element in word 1 (562) of the third operand 560. The result is placed in element 1 (572) of the first operand 570. This is mathematically shown by the equation Ey=Ex+the summation of $E_i$ where i=0 to n, and the addition is an end around carry addition.

Described above is one embodiment of a Vector Checksum instruction that performs a checksum across the elements of a vector register, instead of performing lane arithmetic. In one embodiment, the Vector Checksum instruction performs checksums by performing a sum-across with end around carry additions. In one example, the Vector Checksum instruction takes four 4-byte integer elements from a vector register and adds them together. Any carries from the additions are added back in. The 4-byte sum is added to a 4-byte element in another operand, and then saved in yet a further vector register (e.g., the low order 4-byte element of a vector register with zeros stored in the higher order elements of the vector register).

In a further embodiment, the further vector register or another register is not used to save the value, but instead, one of the other registers (i.e., operands) is used as an accumulator.

The checksum that is provided may be used to preserve data integrity. A checksum is often applied to data and sent over a noisy channel in order to verify the received data is correct. In this example, as described herein, the checksum is computed by adding sequential 4-byte integers together. If there is a carryout of the integer arithmetic operation, the carry, and an additional one, is added to the running sum.

Although checksums are described herein, a similar technique may be used for other end around carry additions.

Figure 6A:
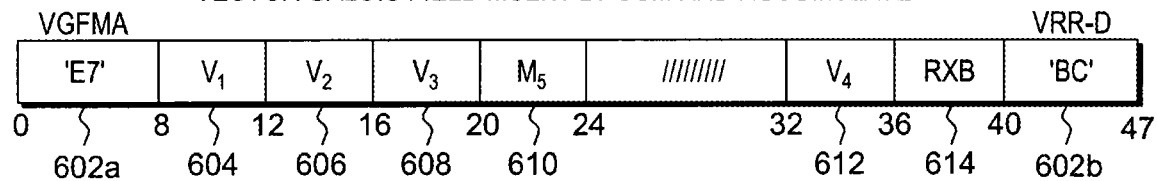
FIG. 6A depicts one example of a format of a Vector Galois Field Multiply Sum and Accumulate instruction.

A further instruction provided in accordance with one aspect is a Vector Galois Field Multiply Sum and Accumulate (VGFMA) instruction, an example of which is depicted in FIG. 6A. In one example, the Vector Galois Field Multiply Sum and Accumulate instruction 600 includes opcode fields 602a (e.g., bits 0-7), 602b (e.g., bits 40-47) indicating a Vector Galois Field Multiply Sum and Accumulate operation; a first vector field 604 (e.g., bits 8-11) used to designate a first vector register ($V_1$); a second vector register field 606 (e.g., bits 12-15) used to designate a second vector register ($V_2$); a third vector register field 608 (e.g., bits 16-19) used to indicate a third vector register ($V_3$); a mask field ($M_5$) 610 (e.g., bits 20-23); a fourth vector register field 612 (e.g., bits 32-35) used to designate a fourth vector register (V4); and an RXB field 614 (e.g., bits 36-39). Each of the fields 604-614, in one example, is separate and independent from the opcode field(s). Further, in one embodiment, they are separate and independent from one another; however, in other embodiments, more than one field may be combined.

In one example, selected bits (e.g., the first two bits) of the opcode designated by opcode field 602a specify the length of the instruction. In this particular example, the selected bits indicate that the length is three halfwords. Further, the format of the instruction is a vector register-and-register operation with an extended opcode field. Each of the vector (V) fields, along with its corresponding extension bit specified by RXB, designates a vector register. In particular, for vector registers, the register containing the operand is specified using, for instance, a 4-bit field of the register field with the addition of its corresponding register extension bit (RXB) as the most significant bit.

$M_5$ field 610 has, for instance, 4 bits, 0-3, and specifies an element size (ES) control. The element size control specifies the size of the elements in vector register operands two and three; the elements in the first and fourth operand are twice the size of those specified by the ES control. For instance, a value of 0 in $M_5$ indicates byte-sized elements; 1 indicates halfword; 2 indicates word; and 3 indicates doubleword, as examples.

In execution of one embodiment of the Vector Galois Field Multiple Sum and Accumulate instruction, each element of the second operand is multiplied in a Galois field (i.e., a finite field having a finite number of elements) with the corresponding element of the third operand. That is, each element of the second operand is multiplied with the corresponding element of the third operand using carryless multiplication. The Galois field has an order of two, in one example. This multiplication is similar to standard binary multiplication, but instead of adding the shifted multiplicand, it is exclusively ORed (XOR). The resulting even-odd pairs of, for instance, double element-sized products are exclusive ORed with each other and exclusive ORed with the corresponding element, e.g., double-wide element, of the fourth operand. The results are placed in, for instance, the double-wide elements of the first operand.

Condition Code: The code remains unchanged.
Program Exceptions:
Data with a data exception code (DXC) FE, Vector Instruction, indicating the vector facility is not enabled
Operation (if the vector facility for z/Architecture is not installed)
Specification
Transaction constraint In a further embodiment, the instruction may include one or more fewer operands. For instance, instead of a fourth operand, the value to be exclusively ORed is in the first operand, which will also include the results. Other variations are also possible.

Further details regarding one embodiment of execution of a Vector Galois Field Multiply Sum and Accumulate instruction is described with reference to FIGS. 6B and 6C. In one example, FIG. 6B depicts one embodiment of the logic performed by a processor to execute a Vector Galois Field Multiply Sum and Accumulate instruction, and FIG. 6C depicts one example of a block diagram showing execution of the logic.

Figure 6B:
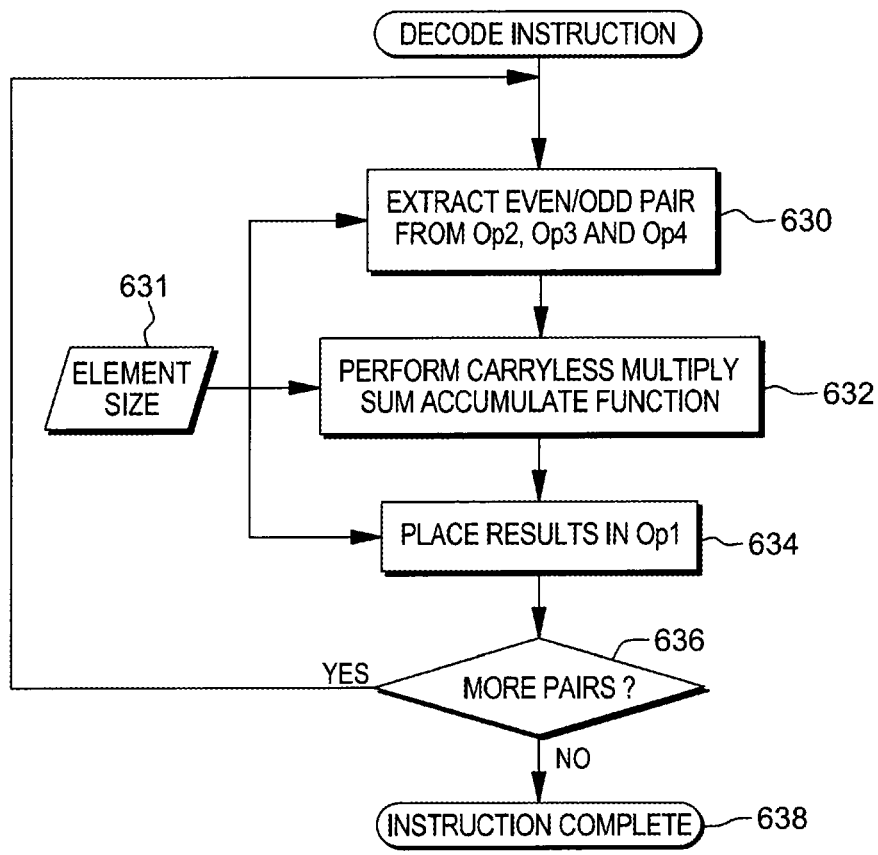
FIG. 6B depicts one embodiment of the logic associated with the Vector Galois Field Multiply Sum and Accumulate instruction of FIG. 6A.
Figure 6C:
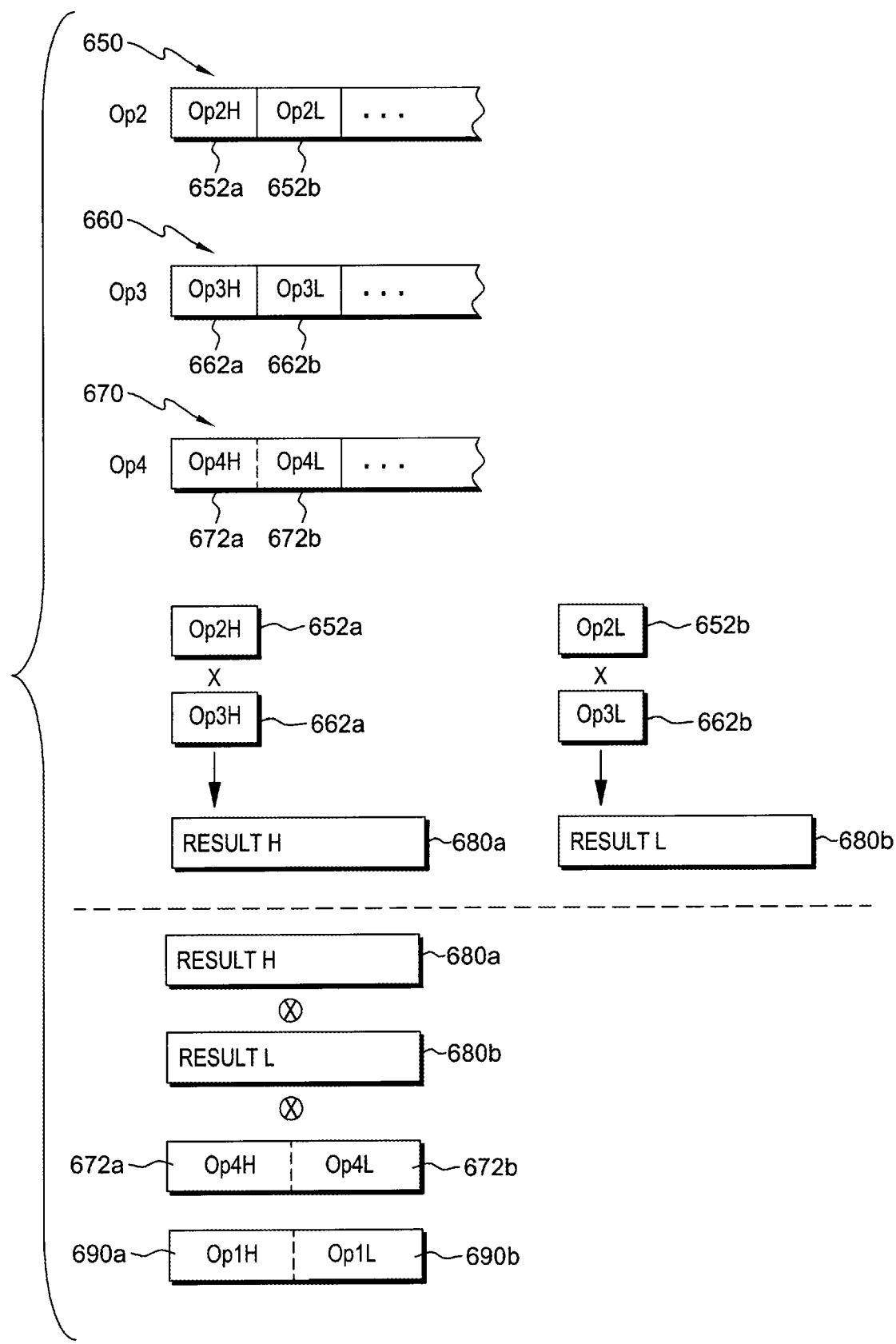
FIG. 6C depicts one example of a block diagram of execution of the Vector Galois Field Multiply Sum and Accumulate instruction of FIG. 6A.

Referring to FIG. 6B, initially, even/odd pairs are extracted from the second operand (OP2), the third operand (OP3), and the fourth operand (OP4), STEP 630, and a carryless multiply sum accumulate function is performed, STEP 632. For instance, when operating in a Galois field of a power of 2, the carryless multiplication is a shift and XOR (exclusive OR), which effectively ignores any carry. The result is placed in the first operand (OP1), STEP 634, and a determination is made as to whether there are more pairs to be extracted, INQUIRY 636. If there are more pairs, then processing continues with STEP 630; otherwise, processing is complete, STEP 638. In one example, the element size 631 is an input to STEPs 630-634.

Further details of the carryless multiply sum accumulate function of STEP 632 are described with reference to FIG. 6C. As shown, a pair of operands OP2H 652a, OP2L 652b are extracted from the second operand 650. Further, operand pair OP3H 662a, OP3L 662b are extracted from third operand 660, and operand pair OP4H 672a and OP4L 672b are extracted from fourth operand 670. Operand OP2H 652a is multiplied with a carryless multiplication to operand OP3H 662a, and a Result H 680a is provided. Similarly, operand OP2L 652b is multiplied using a carryless multiplication to operand OP3L 662b, and a Result L 680b is provided. Result H 680a is then exclusively ORed with Result L 680b, and that result is exclusively ORed with operand OP4H 672a and operand OP4L 672b, and the result is placed in OP1H 690a, OP1L 690b.

Described herein is a vector instruction that performs a carryless multiply operation and then performs a final exclusive OR to create an accumulated sum. This technique may be used with various aspects of error detection codes and cryptography that perform operations in a finite field with an order of 2.

In one example, the instruction performs a carryless multiply operation on a plurality of elements of a vector register to obtain a sum. Further, the instruction performs a final exclusive OR on the sum to create an accumulated sum. When executed, the instruction multiplies in a Galois field corresponding elements of a second vector and a third vector, and the shifted multiplicand is XORed. Each double-wide product is XORed with each other, and the result is XORed with a double-wide corresponding element of a first vector. The result is stored in the first vector register. Although double-word elements are described above, word-sized elements of other element sizes may be used. The instruction can operate on multiple different element sizes.

Figure 7A:
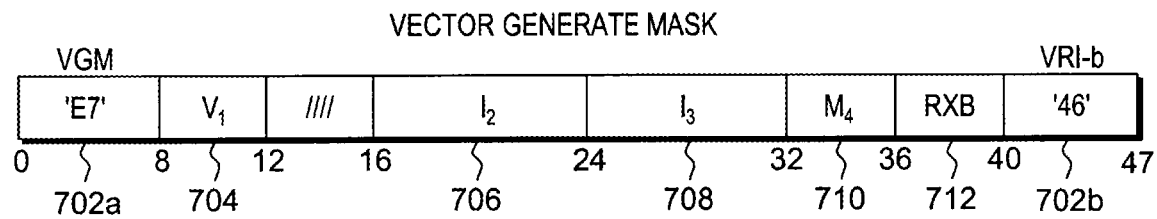
FIG. 7A depicts one example of a format of a Vector Generate Mask instruction.

A further instruction provided in accordance with one aspect is a Vector Generate Mask (VGM) instruction, an example of which is described with reference to FIG. 7A. In one example, the Vector Generate Mask instruction 700 includes opcode fields 702a (e.g., bits 0-7), 702b (e.g., bits 40-47) indicating a Vector Generate Mask operation; a first vector register field 704 (e.g., bits 8-11) used to designate a first vector register ($V_1$); a first immediate field $I_2$ 706 (e.g., bits 16-24) used to specify a first value; a second immediate field ($I_3$) 708 (e.g., bits 24-32) used to specify a second value; a mask field ($M_4$) 710 (e.g., bits 32-35); and an RXB field 712 (e.g., bits 36-39). Each of the fields 704-712, in one example, is separate and independent from the opcode field(s). Further, in one embodiment, they are separate and independent from one another; however, in other embodiments, more than one field may be combined.

In a further embodiment, the first value and/or the second value may be provided in a general purpose register, in memory, in an element of a vector register (differing per element) or from an address computation, as examples. It may be included as an explicit operand of the instruction or as an implied operand or input.

In one example, selected bits (e.g., the first two bits) of the opcode designated by opcode field 702a specify the length of the instruction. In this particular example, the selected bits indicate that the length is three halfwords. Further, the format of the instruction is a vector register-and-immediate operation with an extended opcode field. Each of the vector (V) fields, along with its corresponding extension bit specified by RXB, designates a vector register. In particular, for vector registers, the register containing the operand is specified using, for instance, a four-bit field of the register field with the addition of its corresponding register extension bit (RXB) as the most significant bit.

The $M_4$ field specifies, for instance, an element size control (ES). The element size control specifies the size of the elements in the vector register operands. In one example, bit 0 of the $M_4$ field specifies a byte; bit 1 specifies a halfword (e.g., 2 bytes); bit 2 specifies a word (e.g., 4 bytes; a.k.a. fullword); and bit 3 specifies a doubleword.

In execution of one embodiment of the Vector Generate Mask instruction, for each element in the first operand, a bit mask is generated. The mask includes bits set to one starting at the bit position specified by, e.g., the unsigned integer value in $I_2$ and ending with the bit position specified by, e.g., the unsigned integer value in $I_3$. All other bit positions are set to zero. In one example, only the number of bits needed to represent all of the bit positions for the specified element size are used from the $I_2$ and $I_3$ fields; other bits are ignored. If the bit position in the $I_2$ field is greater than the bit position in the $I_3$ field, the range of bits wraps at the maximum bit position for the specified element size. For instance, assuming byte-sized elements, if $I_2=1$ and $I_3=6$, the resulting mask is $X^'17E^'$ or $B^'01111110^'$. However, if $I_2=6$ and $I_3=1$, then the resulting mask is $X^'81^'$ or $b^'10000001^'$.

Condition Code: The code remains unchanged.
Program Exceptions:
Data with a data exception code (DXC) FE, Vector Instruction, indicating the vector facility is not enabled
Operation (if the vector facility for z/Architecture is not installed)
Specification
Transaction constraint Further details regarding one embodiment of the Vector Generate Mask instruction are described with reference to FIGS. 7B and 7C. In particular, FIG. 7B depicts one embodiment of the logic associated with the Vector Generate Mask instruction performed by a processor, and FIG. 7C depicts one example of a block diagram illustrating one embodiment of execution of the Vector Generate Mask instruction.

Figure 7B:
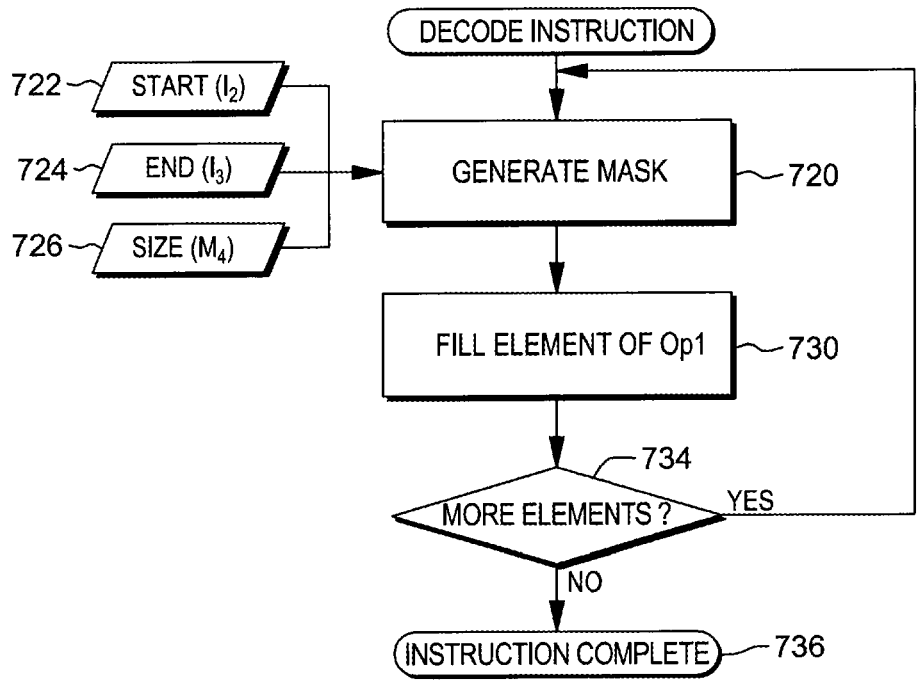
FIG. 7B depicts one embodiment of the logic associated with the Vector Generate Mask instruction of FIG. 7A.

Referring to FIG. 7B, initially, a mask is generated for each element in the first operand, STEP 720. This step uses various inputs, including the value specified in the second operand field as the starting position (722), and the value specified in the third operand field as the ending position (724), and the size of the elements as specified in the $M_4$ field (726). These inputs are used to generate the mask and fill the positions of a selected element, e.g., element 0, of the first operand (Op1), STEP 730. For instance, element 0 of the first operand (Op1) includes a plurality of positions (e.g., bit positions) and starting at the position specified by the unsigned integer value in $I_2$ and ending at the position specified in the unsigned integer value in $I_3$, positions (e.g., bits) of element 0 of the first operand are set to 1. The other bit positions are set to 0. Thereafter, a determination is made as to whether there are more elements in the first operand, INQUIRY 734. If there are more elements, then processing continues with STEP 720. Otherwise, processing is complete, STEP 736.

Figure 7C:
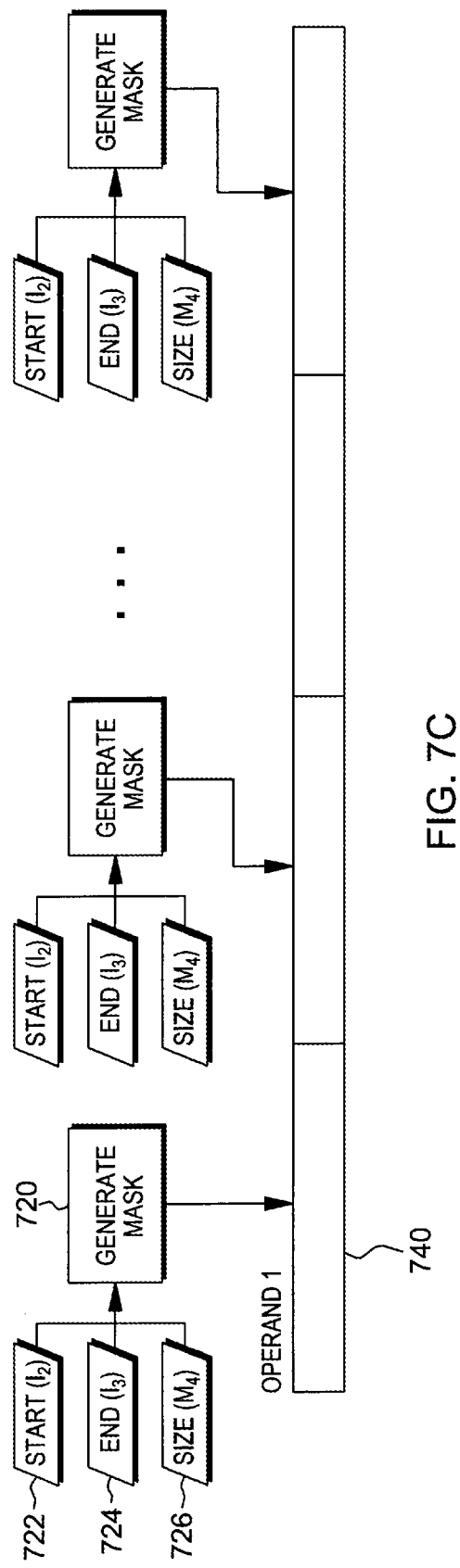
FIG. 7C depicts one example of a block diagram of execution of the Vector Generate Mask instruction of FIG. 7A.

The generation of the mask and the filling of the first operand are pictorially depicted in FIG. 7C. As shown, masks for each element of the first operand are generated 720 using the inputs (e.g., 722-726), and the results of generating the masks are stored in elements of the first operand 740.

Described in detail above is an instruction to generate bit masks for each element of a vector. In one embodiment, the instruction takes a starting bit position and an ending bit position and creates a bit mask that is replicated for each element. The instruction specifies a bit range and each bit within the range, is set to one for each element of the vector register, while other bits are set to zero.

In one embodiment, using an instruction to generate bit masks provides benefits over, for instance, loading bit masks from memory, which increases a cache footprint of an instruction stream and depending on how many masks are needed could increase the latency in a critical loop.

Figure 8A:
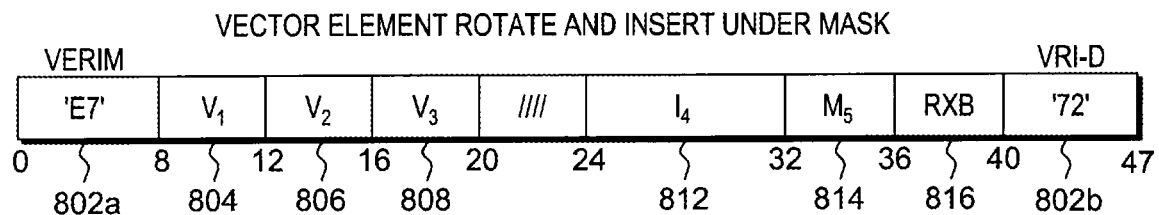
FIG. 8A depicts one example of a format of a Vector Element Rotate and Insert Under Mask instruction.

A yet further instruction provided in accordance with an aspect is a Vector Element Rotate and Insert Under Mask (VERIM) instruction, an example of which is depicted in FIG. 8A. In one example, the Vector Element Rotate and Insert Under Mask instruction 800 includes opcode fields 802a (e.g., bits 0-7), 802b (e.g., bits 40-47) indicating a Vector Element Rotate and Insert Under Mask operation; a first vector register field 804 (e.g., bits 8-11) used to designate a first vector register ($V_1$); a second vector register field 806 (e.g., bits 12-15) used to designate a second vector register ($V_2$); a third vector register field 808 (e.g., bits 16-19) used to designate a third vector register ($V_3$); an immediate field ($I_4$) 812 (e.g., bits 24-31) that includes, e.g., an unsigned binary integer specifying the number of bits to rotate each element; a mask field ($M_5$) 814 (e.g., bits 32-35); and an RXB field 816 (e.g., bits 36-39). Each of the fields 804-816, in one example, is separate and independent from the opcode field(s). Further, in one embodiment, they are separate and independent from one another; however, in other embodiments, more than one field may be combined.

In one example, selected bits (e.g., the first two bits) of the opcode designated by opcode field 802a specify the length of the instruction. In this particular example, the selected bits indicate that the length is three halfwords. Further, the format of the instruction is the vector register-and-immediate operation with an extended opcode field. Each of the vector (V) fields, along with its corresponding extension bit specified by RXB, designates a vector register. In particular, for vector registers, the register containing the operand is specified using, for instance, a 4-bit field of the register field with the addition of its corresponding register extension bit (RXB) as the most significant bit.

The $M_5$ field specifies the element size control (ES). The element size control specifies the size of the elements in the vector register operands. In one example, bit 0 of the $M_5$ field specifies a byte; bit 1 specifies a halfword (e.g., 2 bytes); bit 2 specifies a word (e.g., 4 bytes; a.k.a. fullword); and bit 3 specifies a doubleword.

In execution of one embodiment of a Vector Element Rotate and Insert Under Mask instruction, each element of the second operand is rotated left by the number of bits specified by the fourth operand. Each bit shifted out of the leftmost bit position of the element reenters in the rightmost bit position of the element. The third operand includes a mask in each element. For each bit in the third operand that is one, the corresponding bit of the rotated elements in the second operand replaces the corresponding bit in the first operand. That is, a value of the corresponding bit of the rotated elements replaces a value of the corresponding bit in the first operand. For each bit in the third operand that is zero, the corresponding bit of the first operand remains unchanged. Except for the case when the first operand is the same as either the second or third operand, the second and third operands remain unchanged.

The fourth operand is, e.g., an unsigned binary integer specifying the number of bits by which to rotate each element in the second operand. If the value is larger than the number of bits in the specified element size, the value is reduced modulo the number of bits in the element.

In one example, the mask included in the third operand is generated using the VGM instruction described herein.

Condition Code: The code remains unchanged.
Program Exceptions:
Data with a data exception code (DXC) FE, Vector Instruction, indicating the vector facility is not enabled
Operation (if the vector facility for z/Architecture is not installed)
Specification
Transaction constraint
Programming Notes:
1. A combination of VERIM and VGM may be used to accomplish the full functionality of a Rotate and Insert Selected Bits instruction.
2. Although the bits of the $I_4$ field are defined to contain an unsigned binary integer specifying the number of bits to rotate each element left, a negative value may be coded which effectively specifies a rotate-right amount.

Further details regarding execution of the Vector Element Rotate and Insert Under Mask instruction are described with reference to FIGS. 8B and 8C. In particular, FIG. 8B depicts one embodiment of the logic associated with the Vector Element Rotate and Insert Under Mask instruction performed by a processor, and FIG. 8C pictorially depicts one example of execution of the Vector Element Rotate and Insert Under Mask instruction.

Figure 8B:
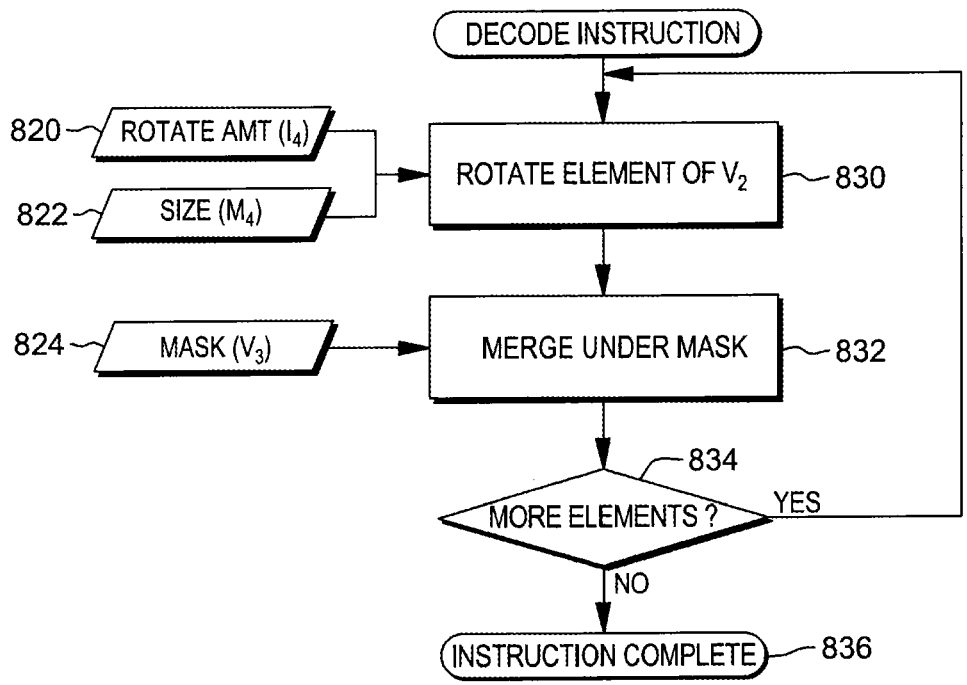
FIG. 8B depicts one embodiment of the logic associated with the Vector Element Rotate and Insert Under Mask instruction of FIG. 8A.

Referring to FIG. 8B, a selected element of the second operand is rotated, STEP 830, by an amount specified in a fourth operand (820). If the value specified in the fourth operand is larger than the number of bits specified in the element size (822), then that value is reduced modulo the number of bits in the element.

Subsequent to rotating the bits of the element, a merge under mask is performed, STEP 832. For instance, for each bit in the third operand (824) that is 1, the corresponding bit of the rotated element in the second operand replaces the corresponding bit in the first operand.

Thereafter, a determination is made as to whether there are more elements to be rotated, INQUIRY 834. If there are more elements to be rotated, then processing continues with STEP 830. Otherwise, processing is complete, STEP 836.

Figure 8C:
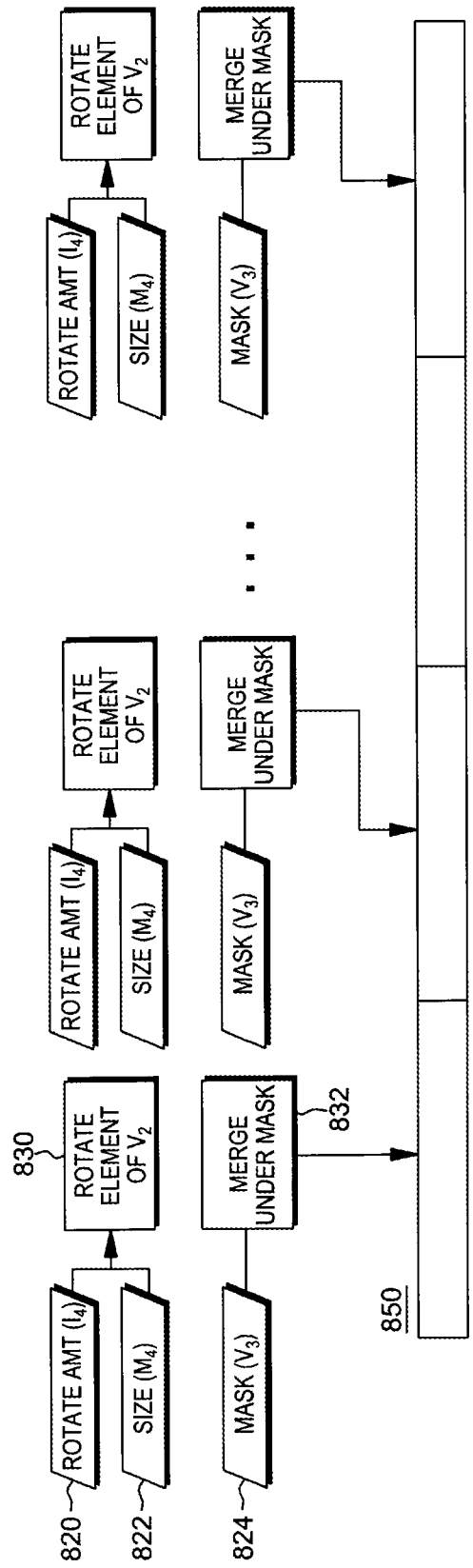
FIG. 8C depicts one example of a block diagram of execution of the Vector Element Rotate and Insert Under Mask instruction of FIG. 8A.

Referring to FIG. 8C, as shown, elements of the second operand are rotated 830 based on inputs 820 and 822.

Further, a merge under mask is performed 832 using input 824. The output is provided in a first operand 850.

Described above is one example of a Vector Element Rotate and Insert Under Mask instruction. This instruction is used to rotate elements in a selected operand by a defined number of bits. Although bits are specified, in a further embodiment, the elements can be rotated by a number of positions and the positions may be other than bits. Further, the instruction may be used with different element sizes.

As one example, such an instruction is used for selecting certain bit ranges out of numbers for table lookups.

During execution of certain vector instructions or other SIMD operations, an exception may occur. When an exception occurs on a SIMD operation, usually it is unknown which element of the vector register caused the exception. A software interrupt handler has to extract each element and re-do the calculation in scalar mode to determine which element or elements caused the exception. However, in accordance with one aspect, when the machine (e.g., processor) processes a program interrupt due to a vector operation, an element index is reported indicating, e.g., the lowest indexed element in the vector which caused the exception. The software interrupt handler can then immediately skip to the element in question and perform any required or desired actions.

For instance, in one embodiment, when a vector data exception causes a program interruption, a vector exception code (VXC) is stored at, for instance, real memory location (e.g., location 147 ($X^l93^l$)), and zeros are stored at, e.g., real memory locations 144-146 ($X^l90^l$-$X^l92^l$). In a further embodiment, the VXC is also placed in a data exception code (DXC) field of a floating point control register, if a specified bit (e.g., bit 45) of a designated control register (e.g., CR0) is 1. When bit 45 of control register 0 is 0 and bit 46 of control register 0 is 1, the DXC of the FPC register and the contents of storage at location 147 ($X^l93^l$) are unpredictable.

Figure 9A:
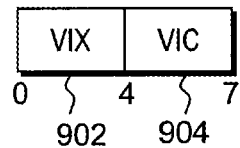
FIG. 9A depicts one example of a Vector Exception Code.

In one embodiment, the VXC distinguishes between various types of vector floating point exceptions and indicates which element caused the exception. In one example, as depicted in FIG. 9A, a vector exception code 900 includes a vector index (VIX) 902, and a vector interrupt code (VIC) 904. In one example, the vector index includes bits 0-3 of the vector exception code, and its value is the index of the leftmost element of a selected vector register that recognized the exception. Further, the vector interrupt code is included in bits 4-7 of the vector exception code, and has the following values, as examples:

| | |
|---|---|
| 0001 | IEEE Invalid operation |
| 0010 | IEEE Division by zero |
| 0011 | IEEE Overflow |
| 0100 | IEEE Underflow |
| 0101 | IEEE Inexact |

In a further embodiment, the VXC includes only the vector index or other position indicator of an element causing an exception.

In one embodiment, the VXC can be set by a number of instructions including, for instance, the following instructions: Vector Floating Point (FP) Add, Vector FP Compare Scalar, Vector FP Compare Equal, Vector FP Compare High or Equal, Vector FP Convert From Fixed 64-Bit, Vector FP Convert From Logical 64-Bit, Vector FP Convert to Fixed 64-Bit, Vector FP Convert to Logical 64-BIt, Vector FP Divide, Vector Load FP Integer, Vector FP Load Length-ened, Vector FP Load Rounded, Vector FP Multiply, Vector FP Multiply and Add, Vector FP Multiple and Subtract, Vector FP Square Root, and Vector FP Subtract, as examples, as well as other types of vector floating point instructions and/or other instructions.

Further details regarding setting the vector exception code is described with reference to FIG. 9B. In one embodiment, a processor of the computing environment performs this logic.

Figure 9B:
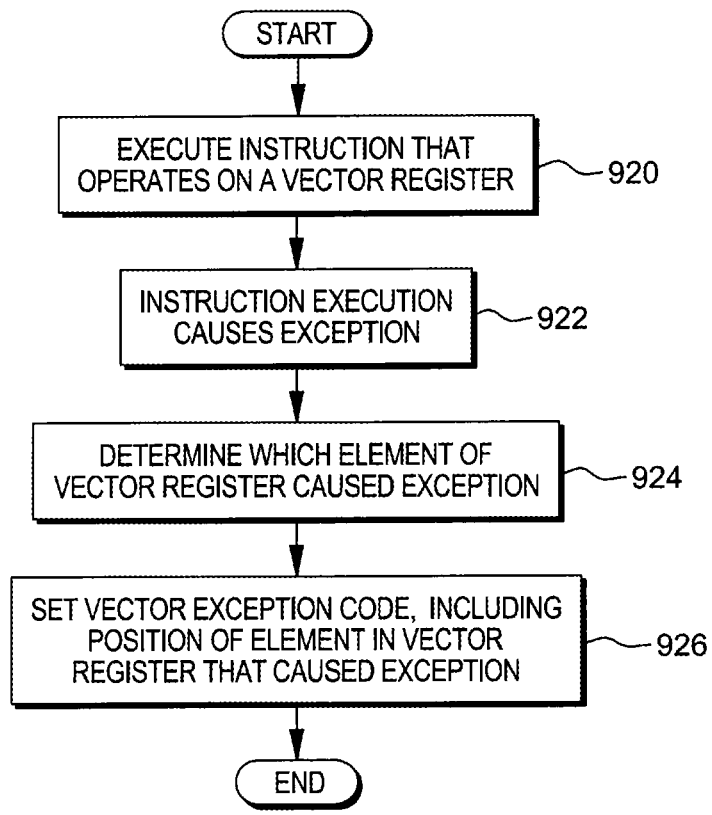
FIG. 9B depicts one embodiment of the logic to set the Vector Exception Code of FIG. 9A.

Referring to FIG. 9B, initially, an instruction that operates on a vector register is executed, such as one of the instructions listed above or another instruction, STEP 920. During execution of the instruction, an exception condition is encountered, STEP 922. In one example, this exception condition causes an interrupt. A determination is made as to which element of the vector register caused the exception, STEP 924. For instance, one or more hardware units of the processor performing computation on the one or more elements of the vector register determine the exception and provide a signal. For instance, if a plurality of hardware units is performing computation on a plurality of elements of a vector register in parallel, and an exception is encountered during processing of one or more of the elements, the hardware unit(s) that is (are) performing the processing that encountered the exception signals an exception condition, as well as an indication of the element it was processing. In a further embodiment, if the elements of the vector are executed sequentially, and an exception is encountered during processing of an element the hardware will indicate what element in the sequence it was working on when the exception occurred.

Based on the exception being signaled, the vector exception code is set, STEP 926. This includes, for instance, indicating a position of an element in the vector register that caused the exception, as well as the interrupt code.

Described in detail above is a vector exception code that provides efficient vector exception handling. In one example, when a machine processes a program interrupt due to a vector operation, an element index is reported indicating a lowest indexed element in the vector register which caused the exception. As a particular example, if a vector add is being performed and there are two elements per vector register, providing A0+B0 and A1+B1, and an inexact result is received for A0+B0, but not A1+B1, then VIX is set to 0 and VIC is set equal to 0101. In a further example, if it happens that A0+B0 does not receive an exception, but A1+B1 receives an exception, then VIX is set equal to 1 (VIC=0101). If both take an exception, then VIX is set to 0 because that is the leftmost indexed position and VIC=0101.

Described in detail above are various vector instructions, as well as a vector exception code that indicates the position of an exception within a vector register. In the flow diagrams provided, some processing may appear sequential; however, in one or more embodiments, elements are processed in parallel, and therefore, there may be no need to check, for instance, if there are more elements to be processed. Many other variations are also possible.

Additionally, in further embodiments, contents of one or more fields of an instruction may be provided in a general purpose register, in memory, in an element of a vector register (differing per element) or from an address computation, as examples. They may be included as an explicit operand of the instruction or as an implied operand or input. Further, one or more instructions may use less operands or inputs, and instead, one or more operands may be used for multiple operations or steps.

Moreover, instead of including an element size control in a field of the instruction, the element size control can be provided in other ways, as described herein. Additionally the element size can be designated by the opcode. For instance, a particular opcode of the instruction designates the operation as well as the size of the elements, etc.

Herein, memory, main memory, storage and main storage are used interchangeably, unless otherwise noted explicitly or by context.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 10:
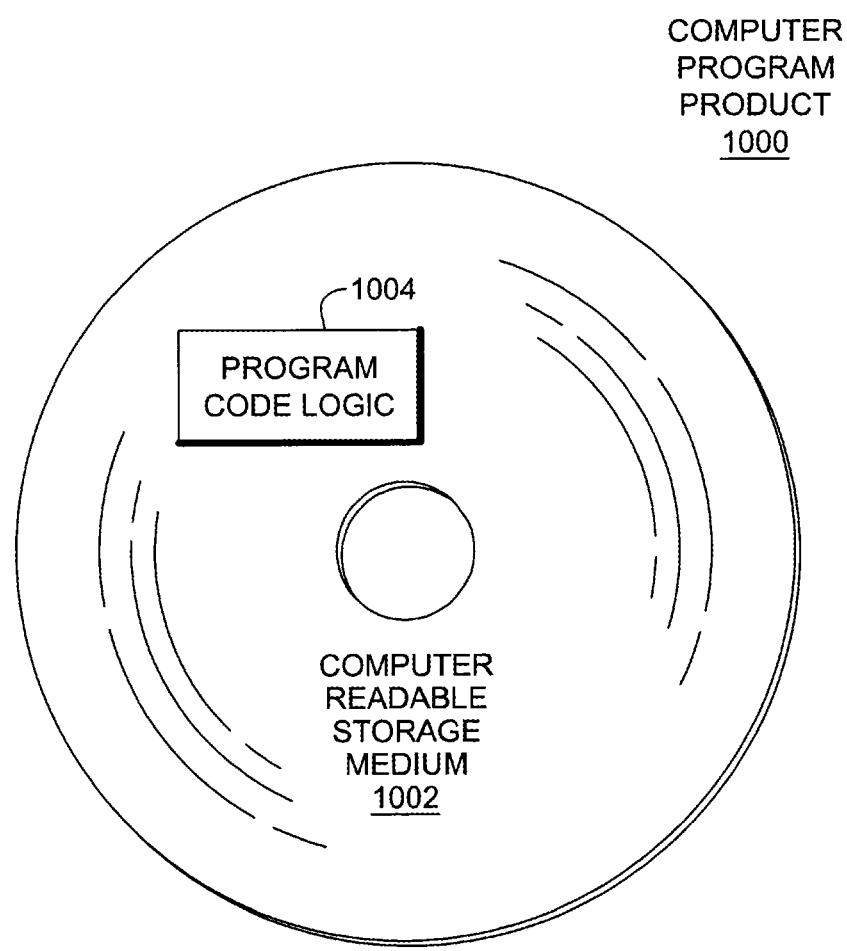
FIG. 10 depicts one embodiment of a computer program product incorporating one or more aspects.

Referring now to FIG. 10, in one example, a computer program product 1000 includes, for instance, one or more non-transitory computer readable storage media 1002 to store computer readable program code means or logic 1004 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for aspects may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, computing environments of other architectures can incorporate and use one or more aspects. Further, vectors of other sizes may be used, and changes to the instructions may be made without departing from the one or more aspects. Moreover, registers other than vector registers may be used. Additionally, in other embodiments, a vector operand may be a memory location, instead of a vector register. Other variations are also possible.

Further, other types of computing environments can benefit from one or more aspects. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 11:
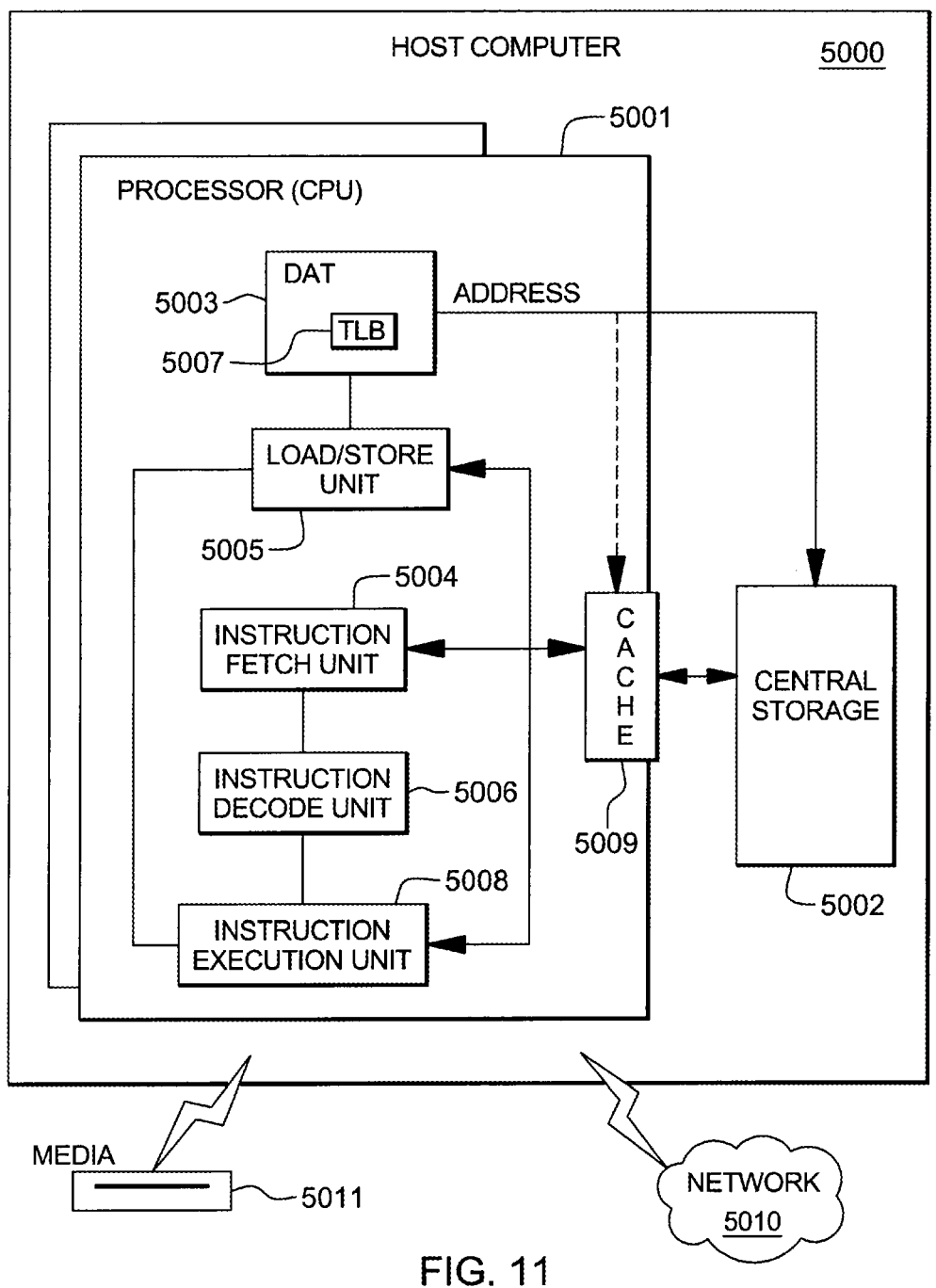
FIG. 11 depicts one embodiment of a host computer system.

Referring to FIG. 11, representative components of a Host Computer system 5000 to implement one or more aspects are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects). Referring to FIG. 11, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 12:
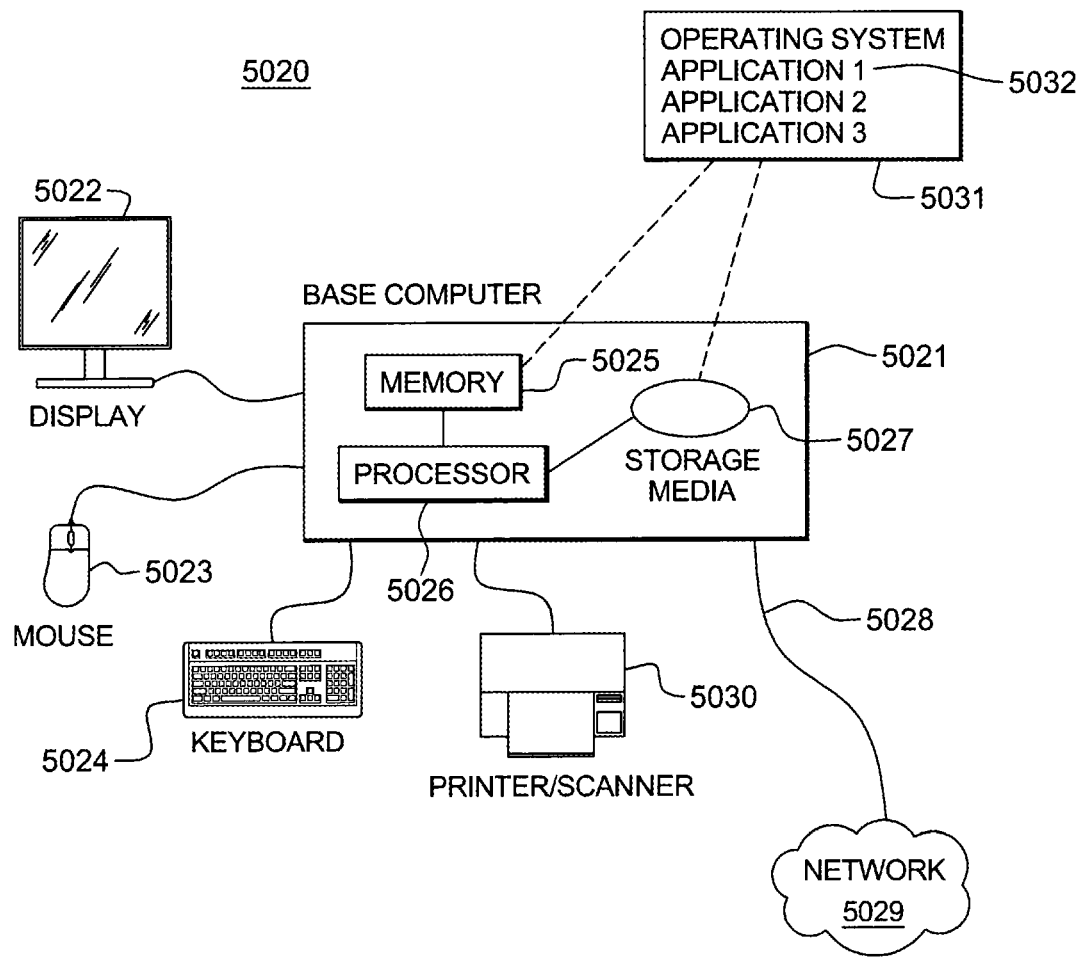
FIG. 12 depicts a further example of a computer system.

FIG. 12 illustrates a representative workstation or server hardware system in which one or more aspects may be practiced. The system 5020 of FIG. 12 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 13:
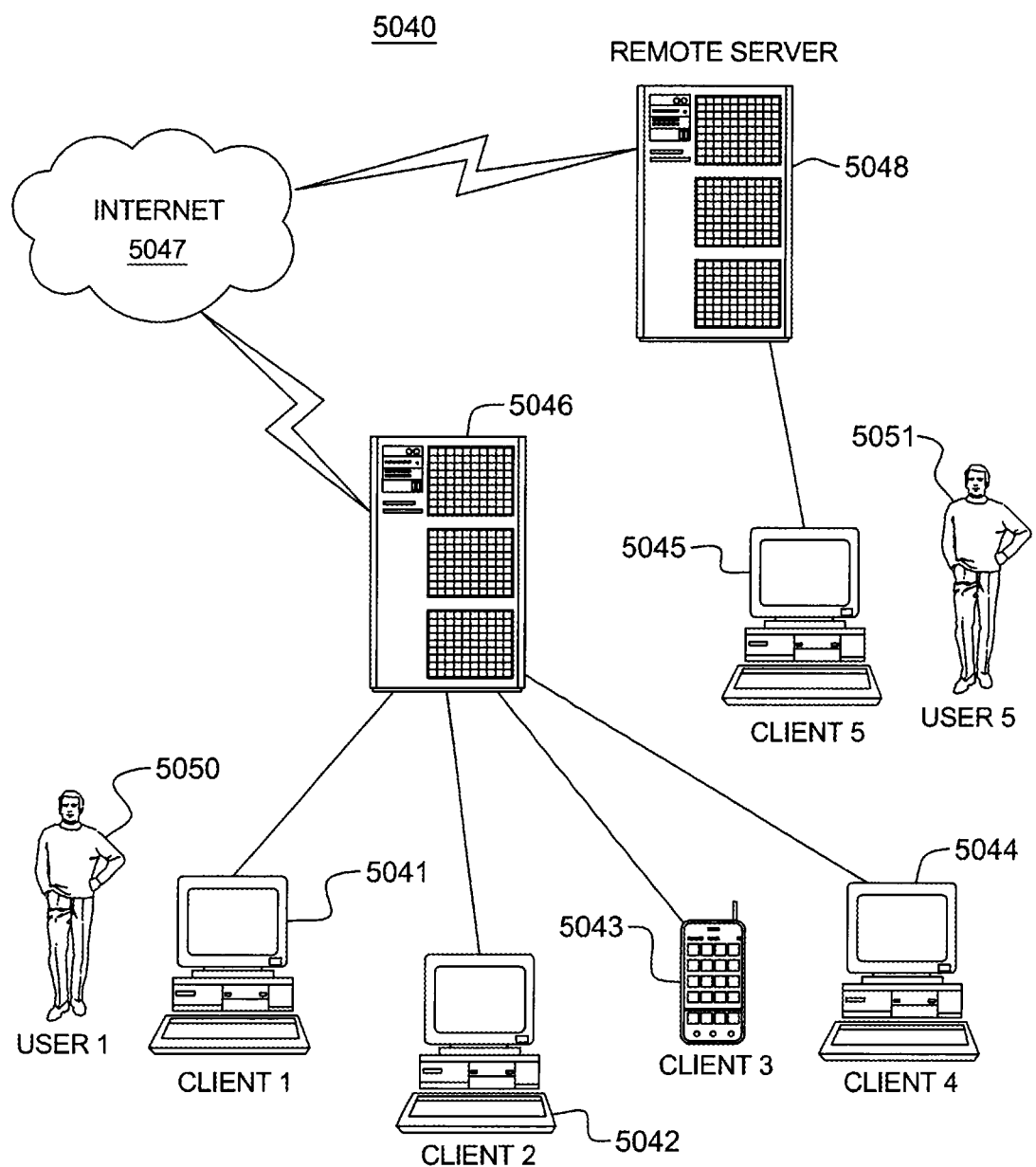
FIG. 13 depicts another example of a computer system comprising a computer network.

FIG. 13 illustrates a data processing network 5040 in which one or more aspects may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 13, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z server available from International Business Machines Corporation.

Referring concurrently to FIG. 12 and FIG. 13, software programming code which may embody one or more aspects of the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 14:
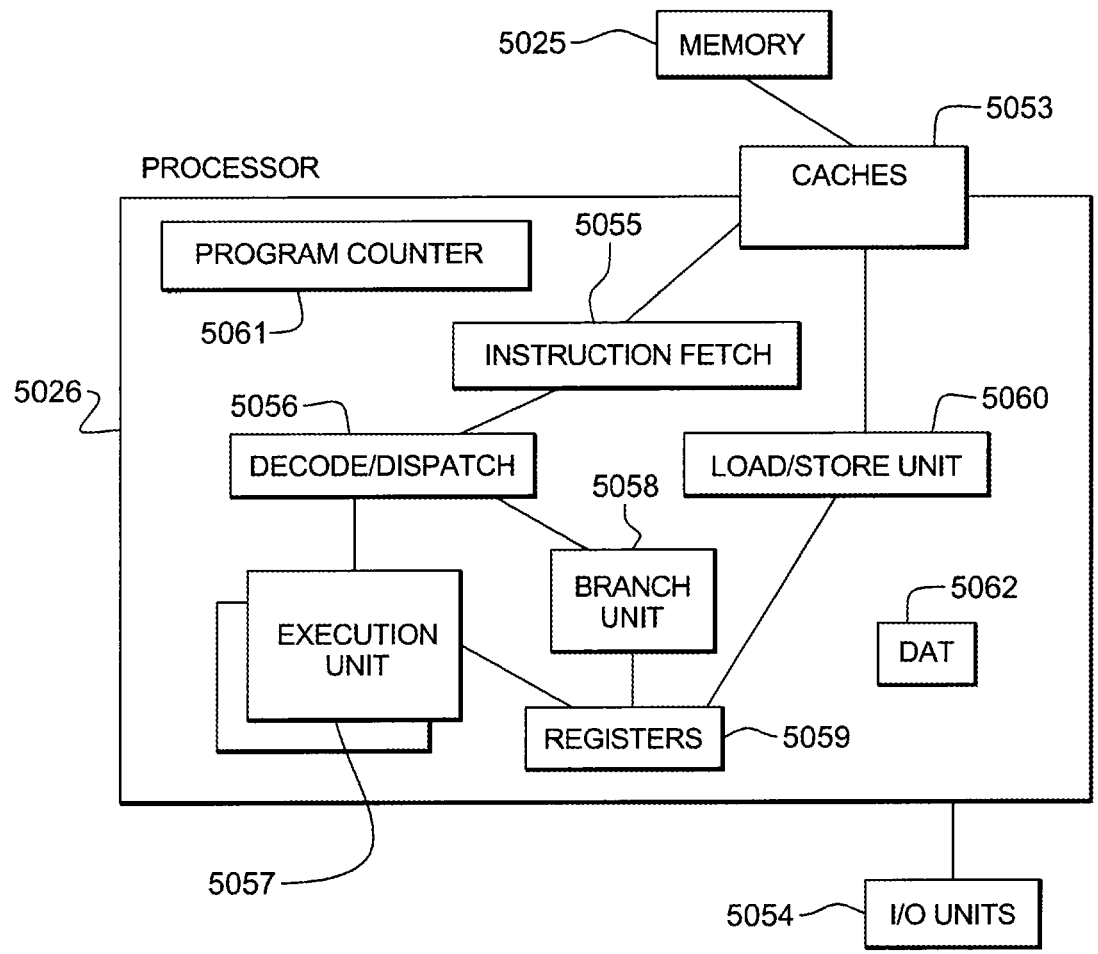
FIG. 14 depicts one embodiment of various elements of a computer system.

Referring to FIG. 14, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 15A:
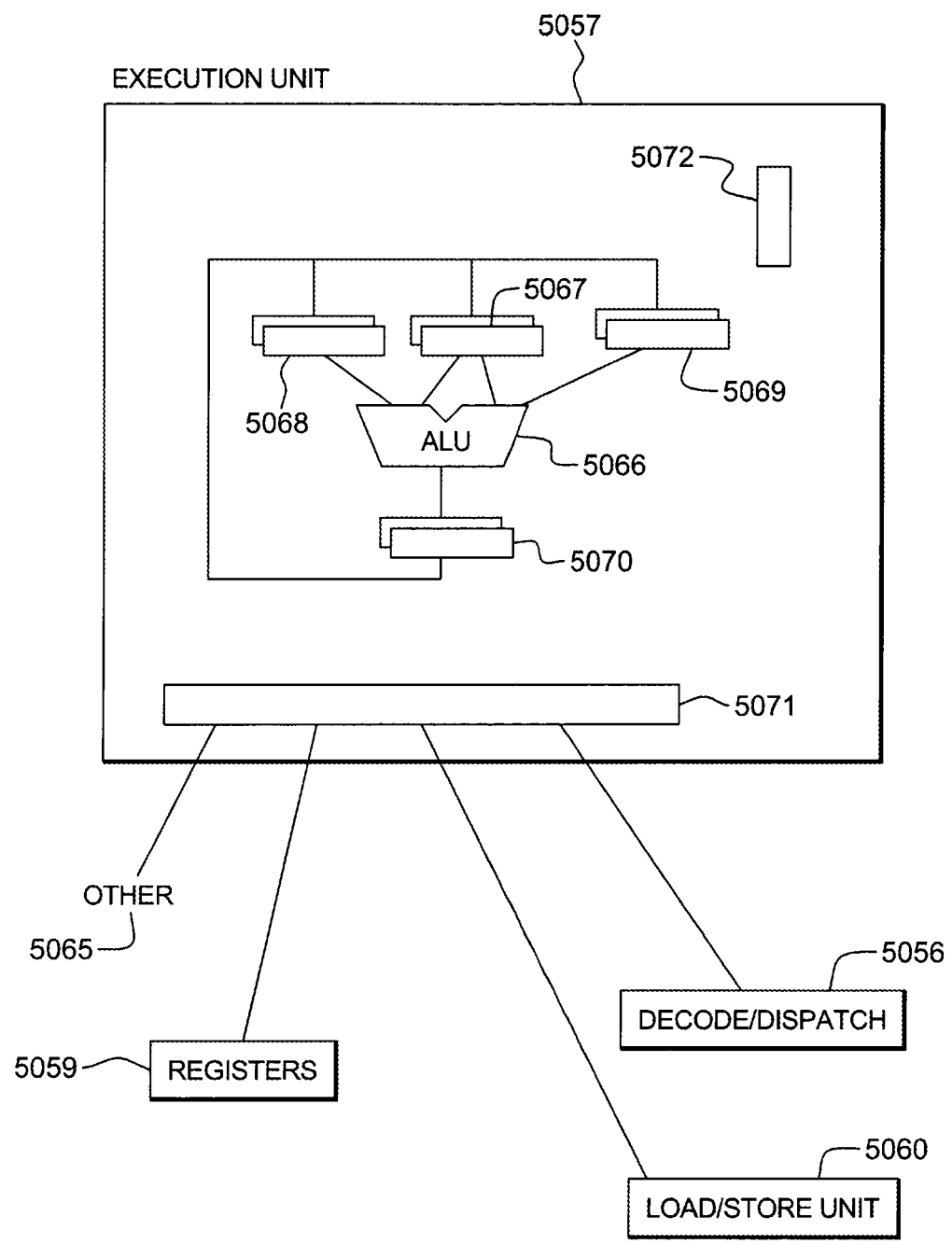
FIG. 15A depicts one embodiment of the execution unit of the computer system of FIG. 14.

A processor 5026 typically has one or more units 5057, 5058, 5060 for executing the function of the instruction. Referring to FIG. 15A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 15B:
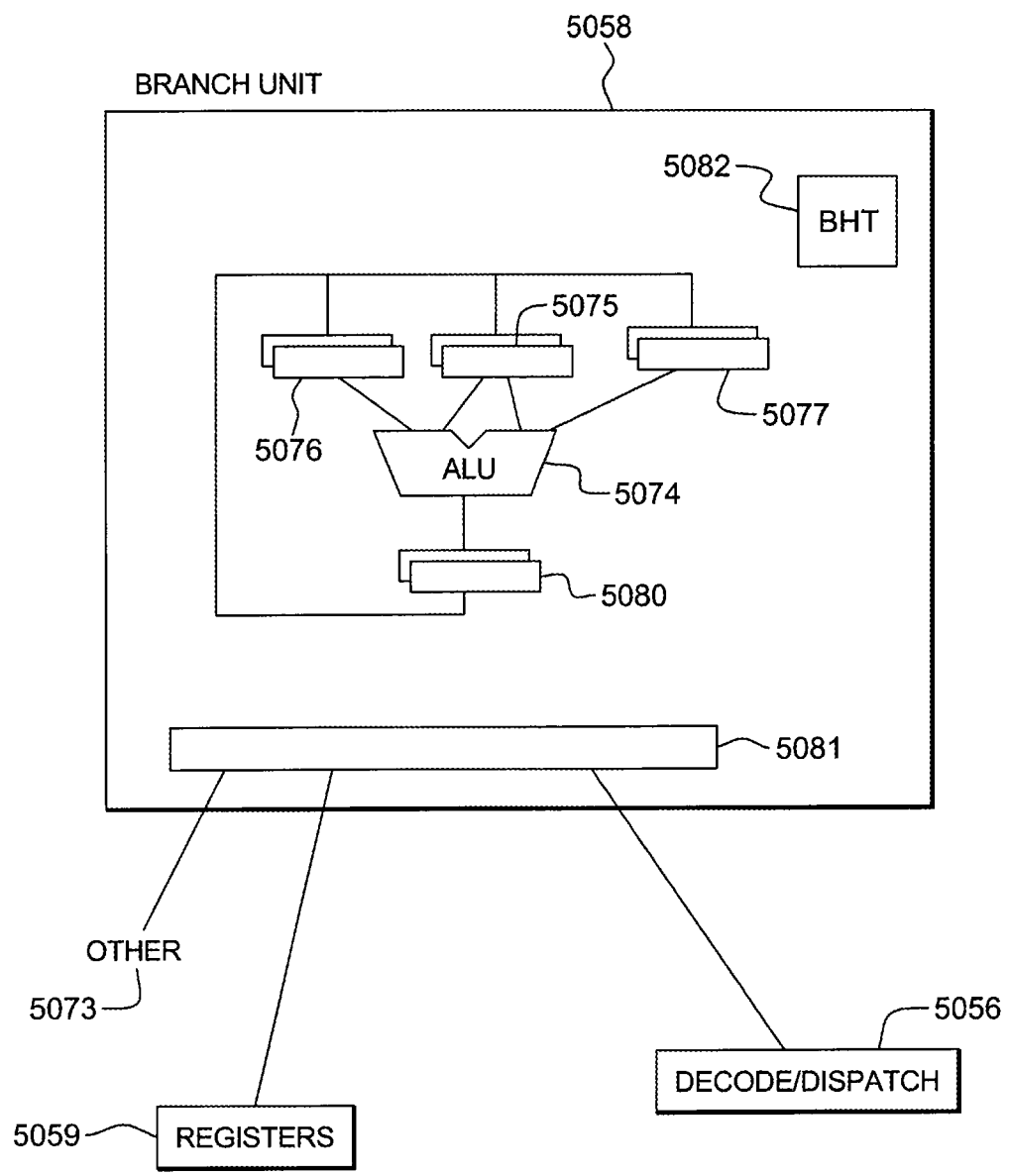
FIG. 15B depicts one embodiment of the branch unit of the computer system of FIG. 14.

Referring to FIG. 15B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example. Location herein typically implies a location in main memory (main storage) unless otherwise indicated.

Figure 15C:
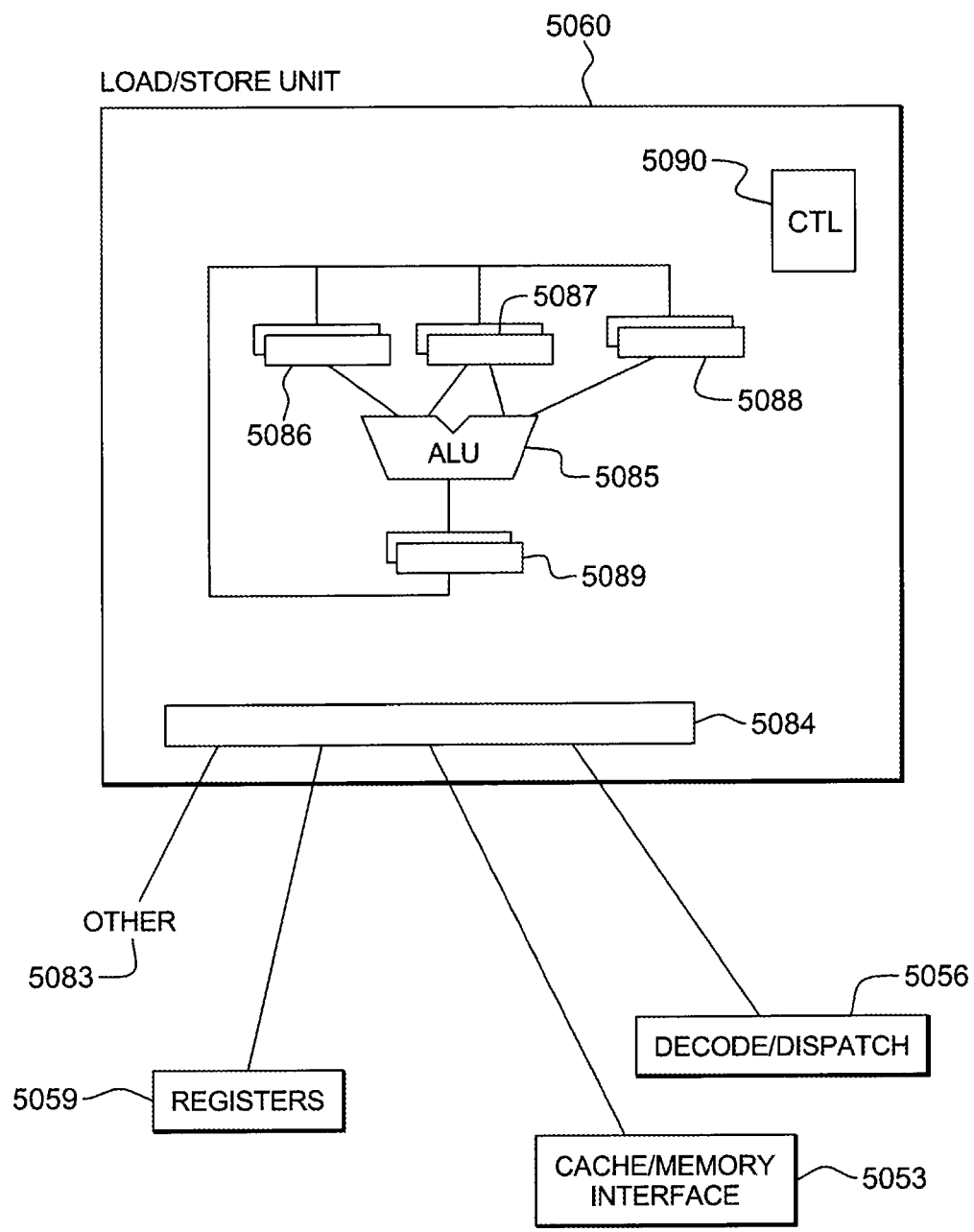
FIG. 15C depicts one embodiment of the load/store unit of the computer system of FIG. 14.

Referring to FIG. 15C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 14) provide the processor with means for attaching to peripheral devices including tape, disc, printers, displays, and networks for example. I/O units are often presented to the computer program by software drivers. In mainframes, such as the System z from IBM, channel adapters and open system adapters are I/O units of the mainframe that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel AMD™, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of one or more embodiments. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 16:
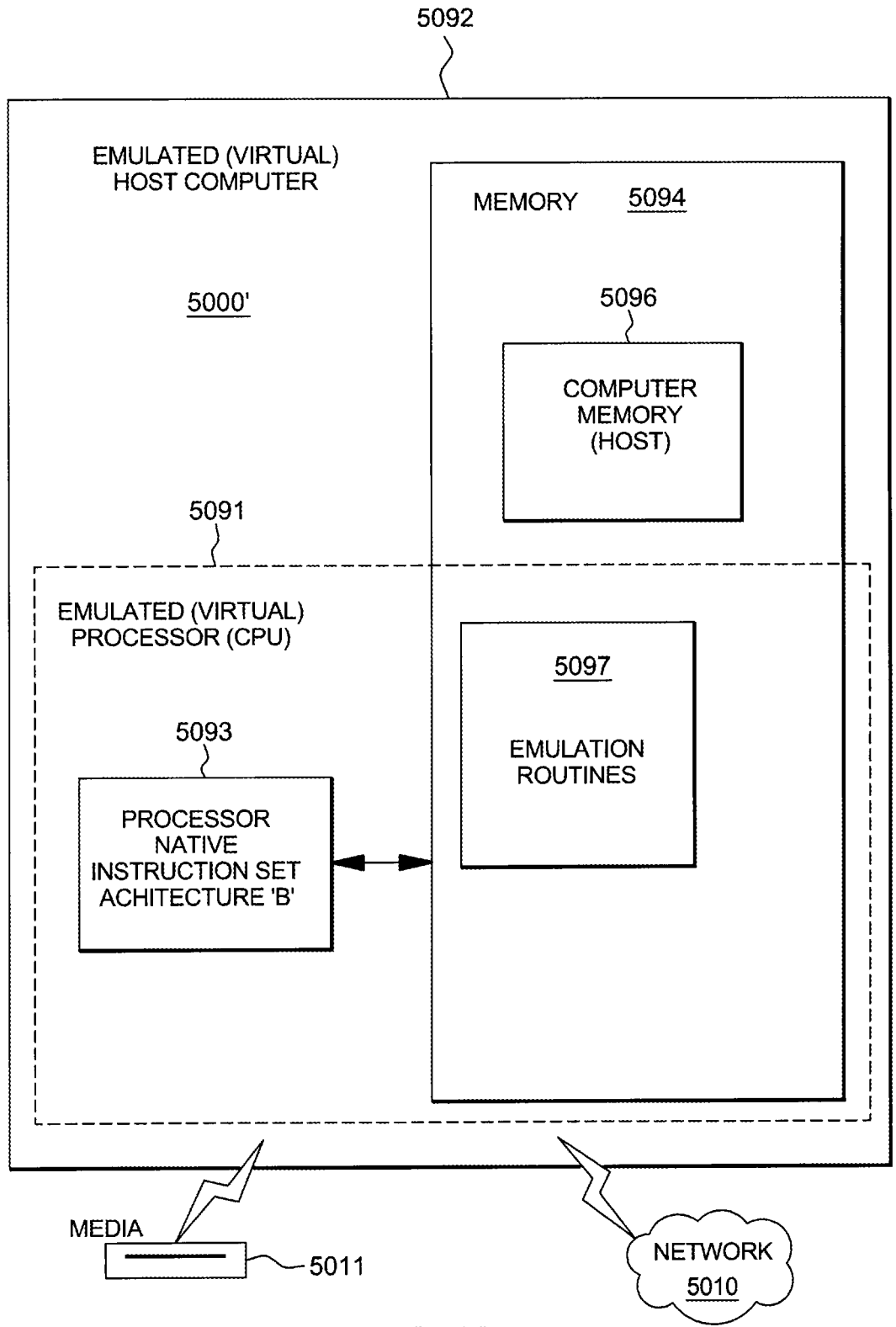
FIG. 16 depicts one embodiment of an emulated host computer system.

In FIG. 16, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects has been presented for purposes of illustration and description, but is not intended to be exhaustive or limited to the invention in the form disclosed. Many modifications and variations will be apparent to those of ordinary skill in the art without departing from the scope and spirit of one or more aspects. The embodiment was chosen and described in order to best explain the principles of the one or more aspects and the practical application, and to enable others of ordinary skill in the art to understand the one or more aspects for various embodiments with various modifications as are suited to the particular use contemplated.

What is claimed is:

1. A computer program product for executing a machine instruction, the computer program product comprising:
    at least one non-transitory computer readable storage medium readable by at least one processing circuit and storing instructions for performing a method comprising:
    obtaining a machine instruction for execution, the machine instruction having associated therewith:
    an opcode to identify a Vector Floating Point Test Data Class Immediate operation;
    a first operand; and
    a second operand; and
    executing the machine instruction, the executing comprising:
    determining properties of a chosen element of the second operand;
    selecting from an input to the machine instruction a selected data unit representing the properties of the chosen element, the input including one or more data units to represent one or more properties;
    checking whether the selected data unit is set to a particular value; and
    based on the checking, setting an element in the first operand that corresponds to the chosen element of the second operand, the setting based on whether the selected data unit is set to the particular value.

2. The computer program product of claim 1, wherein the second operand comprises a plurality of elements, wherein the determining comprises determining properties for each element of the plurality of elements, and wherein the setting comprises setting each element in the first operand corresponding to each element in the second operand based on whether the selected data unit is set to the particular value.

3. The computer program product of claim 1, wherein the setting comprises setting the element in the first operand to ones based on the checking indicating the selected data unit is set to the particular value, and setting the element in the first operand to zero based on the checking indicating the selected data unit is not set to the particular value.

4. The computer program product of claim 1, wherein the properties comprise a class and a sign.

5. The computer program product of claim 1, wherein the input comprises a plurality of data units, each data unit of the plurality of data units representing a class and a sign.

6. The computer program product of claim 5, wherein the plurality of data units comprises a plurality of bits, and wherein each bit represents one element class of a plurality of element classes, the plurality of element classes comprising zero, normal number, subnormal number, infinity, quiet not-a-number, signaling not-a-number, and each bit represents a sign of positive or negative.

7. The computer program product of claim 1, wherein the machine instruction comprises a first register field to be used to designate a first register, the first register comprising the first operand, a second register field to be used to designate a second register, the second register comprising the second operand, and a field including the input.

8. The computer program product of claim 7, wherein the machine instruction further comprises a mask field, the mask field to be used to indicate whether one or more elements of the second operand are to be included in the determining, and another mask field, the another mask field to be used to indicate a size of a floating point number in an element of the second operand.

9. The computer program product of claim 1, wherein the machine instruction has associated therewith a mask, the mask to indicate whether one or more elements of the second operand are to be included in the determining.

10. The computer program product of claim 1, wherein the executing further comprises setting a condition code for the machine instruction, the condition code being separate from the first operand and to summarize the setting of the elements of the first operand.

11. A computer system for executing a machine instruction, the computer system comprising:
   a memory; and
   a processor in communication with the memory, wherein the computer system is configured to perform a method, said method comprising:
      obtaining a machine instruction for execution, the machine instruction having associated therewith:
         an opcode to identify a Vector Floating Point Test Data Class Immediate operation;
         a first operand; and
         a second operand; and
      executing the machine instruction, the executing comprising:
         determining properties of a chosen element of the second operand;
         selecting from an input to the machine instruction a selected data unit representing the properties of the chosen element, the input including one or more data units to represent one or more properties;
         checking whether the selected data unit is set to a particular value; and
         based on the checking, setting an element in the first operand that corresponds to the chosen element of the second operand, the setting based on whether the selected data unit is set to the particular value.

12. The computer system of claim 11, wherein the second operand comprises a plurality of elements, wherein the determining comprises determining properties for each element of the plurality of elements, and wherein the setting comprises setting each element in the first operand corresponding to each element in the second operand based on whether the selected data unit is set to the particular value.

13. The computer system of claim 11, wherein the properties comprise a class and a sign.

14. The computer system of claim 11, wherein the machine instruction has associated therewith a mask, the mask to indicate whether one or more elements of the second operand are to be included in the determining.

15. A computer-implemented method of executing a machine instruction, the computer-implemented method comprising:
   obtaining, by a processor, a machine instruction for execution, the machine instruction having associated therewith:
      an opcode to identify a Vector Floating Point Test Data Class Immediate operation;
      a first operand; and
      a second operand; and
   executing the machine instruction, the executing comprising:
      determining properties of a chosen element of the second operand;
      selecting from an input to the machine instruction a selected data unit representing the properties of the chosen element, the input including one or more data units to represent one or more properties;
      checking whether the selected data unit is set to a particular value; and
      based on the checking, setting an element in the first operand that corresponds to the chosen element of the second operand, the setting based on whether the selected data unit is set to the particular value.

16. The computer-implemented method of claim 15, wherein the second operand comprises a plurality of elements, wherein the determining comprises determining properties for each element of the plurality of elements, and wherein the setting comprises setting each element in the first operand corresponding to each element in the second operand based on whether the selected data unit is set to the particular value.

17. The computer-implemented method of claim 15, wherein the properties comprise a class and a sign.

18. The computer-implemented method of claim 15, wherein the machine instruction has associated therewith a mask, the mask to indicate whether one or more elements of the second operand are to be included in the determining.

19. The computer program product of claim 1, wherein the determining properties comprises:
   extracting a value from the chosen element;
   converting the value to a type number; and
   obtaining the properties of the chosen element based on the type number.

20. The computer program product of claim 19, wherein the value is a binary floating point value, and the converting receives as input a size of the binary floating point value.

* * * * *